(12) United States Patent
Jenkins et al.

(10) Patent No.: US 11,603,326 B2
(45) Date of Patent: Mar. 14, 2023

(54) SYSTEMS AND METHODS FOR TREATMENT PROCESSES

(71) Applicants: Theodore K. Jenkins, Charleston, SC (US); Heath E. Murphy, Charleston, SC (US); William Whitfield King, Jr., Mt. Pleasant, SC (US); Tyler Kunz, Cedarburg, WI (US); David D. Lauer, Germantown, WI (US)

(72) Inventors: Theodore K. Jenkins, Charleston, SC (US); Heath E. Murphy, Charleston, SC (US); William Whitfield King, Jr., Mt. Pleasant, SC (US); Tyler Kunz, Cedarburg, WI (US); David D. Lauer, Germantown, WI (US)

(73) Assignee: ENVIROMIX, INC., Charleston, SC (US)

( * ) Notice: Subject to any disclaimer, the term of this patent is extended or adjusted under 35 U.S.C. 154(b) by 167 days.

(21) Appl. No.: 16/148,988

(22) Filed: Oct. 1, 2018

(65) Prior Publication Data

US 2019/0100451 A1    Apr. 4, 2019

Related U.S. Application Data

(60) Provisional application No. 62/565,833, filed on Sep. 29, 2017.

(51) Int. Cl.
*C02F 3/00* (2006.01)
*C02F 3/30* (2023.01)
(Continued)

(52) U.S. Cl.
CPC ........ *C02F 3/006* (2013.01); *B01F 23/23121* (2022.01); *B01F 35/2112* (2022.01);
(Continued)

(58) Field of Classification Search
CPC .... C02F 3/006; C02F 3/20; C02F 3/30; C02F 2209/005; C02F 2209/03; C02F 2209/38;
(Continued)

(56) References Cited

U.S. PATENT DOCUMENTS 3,153,682 A    10/1964 Walker
4,210,534 A    7/1980  Molver
(Continued)

FOREIGN PATENT DOCUMENTS

CN    103676647        3/2014
EP    1992946 A1       11/2008
(Continued)

OTHER PUBLICATIONS

Of "Piping and plumbing fitting" Wikipedia published Jun. 17, 2015 accessed at <https://en.wikipedia.org/w/index.php?title=Piping_and_plumbing_fitting&oldid=667329152> (Year: 2015).*
(Continued)

*Primary Examiner* — Stephen Hobson
(74) *Attorney, Agent, or Firm* — Nelson Mullins Riley & Scarborough LLP; Ashley B. Summer, Esq.

(57) ABSTRACT

Systems and methods for aeration and mixing processes are disclosed.

16 Claims, 20 Drawing Sheets

(51) Int. Cl.
| | |
|---|---|
| *C02F 3/20* | (2023.01) |
| *B01F 23/231* | (2022.01) |
| *B01F 35/21* | (2022.01) |
| *B01F 35/22* | (2022.01) |
| *B01F 35/221* | (2022.01) |
| *B01F 101/00* | (2022.01) |

(52) U.S. Cl.
CPC ...... *B01F 35/2113* (2022.01); *B01F 35/2209* (2022.01); *B01F 35/2211* (2022.01); *C02F 3/20* (2013.01); *C02F 3/30* (2013.01); *B01F 23/23113* (2022.01); *B01F 23/23125* (2022.01); *B01F 23/231143* (2022.01); *B01F 23/231264* (2022.01); *B01F 2101/305* (2022.01); *C02F 2209/005* (2013.01); *C02F 2209/03* (2013.01); *C02F 2209/38* (2013.01); *C02F 2209/42* (2013.01)

(58) Field of Classification Search
CPC .............. C02F 2209/42; B01F 3/04248; B01F 15/00162; B01F 15/00253; B01F 23/23121; B01F 35/2112; B01F 35/2113; B01F 35/2209; B01F 35/2211; B01F 23/23113; B01F 23/231143; B01F 23/23125; B01F 23/231264; B01F 2101/305; Y02W 10/10
See application file for complete search history.

(56) References Cited

U.S. PATENT DOCUMENTS

| | | | |
|---|---|---|---|
| 4,333,838 A | 6/1982 | Ballnus | |
| 4,563,277 A | 1/1986 | Tharp | |
| 4,595,296 A | 6/1986 | Parks | |
| 4,859,341 A | 8/1989 | Schreiber | |
| 4,888,620 A | 12/1989 | Schmit | |
| 5,129,935 A | 7/1992 | Cerroni | |
| 5,133,876 A | 7/1992 | Tharp | |
| 5,242,592 A | 9/1993 | Ballnus | |
| 5,266,200 A | 11/1993 | Reid | |
| 5,304,308 A | 4/1994 | Tsumura et al. | |
| 5,482,630 A | 1/1996 | Lee et al. | |
| 5,521,814 A | 5/1996 | Teran et al. | |
| 5,536,409 A | 7/1996 | Dunkers | |
| 5,558,763 A | 9/1996 | Funakoshi et al. | |
| 5,582,734 A | 12/1996 | Coleman et al. | |
| 5,624,565 A | 4/1997 | Lefevre et al. | |
| 5,626,754 A | 5/1997 | Ballnus | |
| 5,639,373 A | 6/1997 | Mahendran et al. | |
| 5,733,456 A | 3/1998 | Okey et al. | |
| 5,783,083 A | 7/1998 | Henshaw et al. | |
| 5,910,250 A | 6/1999 | Mahendran et al. | |
| 5,989,428 A | 11/1999 | Goronszy | |
| 6,042,677 A | 3/2000 | Mahendran et al. | |
| 6,183,642 B1 | 2/2001 | Heijnen et al. | |
| 6,245,239 B1 | 6/2001 | Cote et al. | |
| 6,280,636 B1 | 8/2001 | Locklair | |
| 6,282,636 B1 | 8/2001 | Yeh et al. | |
| 6,294,039 B1 | 9/2001 | Mahendran et al. | |
| 6,350,747 B1 | 2/2002 | Glennon et al. | |
| 6,426,004 B1 | 7/2002 | Hiatt et al. | |
| 6,475,395 B1 | 11/2002 | Schmit et al. | |
| 6,535,795 B1 | 3/2003 | Schroeder et al. | |
| 6,550,747 B2 | 4/2003 | Rabie et al. | |
| 6,609,070 B1 | 8/2003 | Lueck | |
| 6,616,843 B1 | 9/2003 | Behmann et al. | |
| 6,620,319 B2 | 9/2003 | Behmann et al. | |
| 6,629,773 B2 | 10/2003 | Parks | |
| 6,650,747 B1 | 11/2003 | Bala et al. | |
| 6,682,652 B2 | 1/2004 | Mahendran et al. | |
| 6,783,679 B1 | 8/2004 | Rozich | |
| 6,808,629 B2 | 10/2004 | Wouters-Wasiak et al. | |
| 6,863,810 B2 | 3/2005 | Chann | |
| 6,882,419 B2 | 4/2005 | Coleman et al. | |
| 6,964,741 B2 | 11/2005 | Mahendran et al. | |
| 7,282,141 B2 | 10/2007 | Koopmans et al. | |
| 7,374,675 B2 | 5/2008 | Koopmans et al. | |
| 7,396,453 B1 | 7/2008 | Probst | |
| 7,413,654 B2 | 8/2008 | Applegate et al. | |
| 7,416,669 B1 | 8/2008 | Carolan et al. | |
| 7,427,354 B2 | 9/2008 | Eto | |
| 7,476,322 B2 | 1/2009 | Dimitriou et al. | |
| 7,524,419 B2 | 4/2009 | Koopmans et al. | |
| 7,655,142 B2 | 2/2010 | Liu et al. | |
| 7,728,888 B2 | 6/2010 | Ono | |
| 7,763,173 B1 | 7/2010 | Koopmans et al. | |
| 8,323,498 B2 | 12/2012 | Jenkins et al. | |
| 8,505,881 B2 | 8/2013 | Locklair et al. | |
| 8,702,070 B2 | 4/2014 | Locklair et al. | |
| 9,416,037 B2 | 8/2016 | Locklair et al. | |
| 9,567,245 B2 | 2/2017 | Jenkins et al. | |
| 10,752,532 B2 | 8/2020 | Locklair et al. | |
| 2003/0006512 A1 | 1/2003 | Kelly | |
| 2003/0071377 A1 | 4/2003 | Tharp | |
| 2004/0248306 A1 | 12/2004 | Hernandez et al. | |
| 2005/0279704 A1 | 12/2005 | Miklos | |
| 2006/0131232 A1 | 6/2006 | Rosen et al. | |
| 2006/0163156 A1 | 7/2006 | Eto | |
| 2006/0254977 A1 | 11/2006 | Koopmans et al. | |
| 2006/0254979 A1 | 11/2006 | Koopmans et al. | |
| 2006/0254980 A1 | 11/2006 | Koopmans et al. | |
| 2007/0007214 A1 | 1/2007 | Zha et al. | |
| 2007/0108125 A1 | 5/2007 | Cho et al. | |
| 2008/0296229 A1 | 12/2008 | Yamasaki et al. | |
| 2010/0047424 A1 | 2/2010 | Cousin et al. | |
| 2010/0163484 A1 | 7/2010 | Cormier et al. | |
| 2010/0187173 A1 | 7/2010 | Lee et al. | |
| 2013/0003486 A1 | 1/2013 | Jenkins et al. | |
| 2014/0183129 A1* | 7/2014 | Locklair | B01F 3/0412 |
| | | | 210/620 |
| 2015/0048026 A1* | 2/2015 | Jenkins | C02F 3/302 |
| | | | 210/614 |
| 2016/0318781 A1 | 11/2016 | Locklair et al. | |
| 2017/0152167 A1 | 6/2017 | Jenkins et al. | |
| 2019/0135665 A1 | 5/2019 | Jenkins et al. | |

FOREIGN PATENT DOCUMENTS

| | | |
|---|---|---|
| GB | 717464 A | 10/1954 |
| JP | 64-070198 | 3/1998 |
| WO | 2000021890 A1 | 4/2000 |
| WO | 2007008630 A2 | 1/2007 |
| WO | 2007038443 A2 | 4/2007 |
| WO | 2008046139 A1 | 4/2008 |
| WO | 20110046929 A3 | 4/2011 |

OTHER PUBLICATIONS

PCT International Search Report for PCT/US2011/054809 dated Jan. 5, 2012.
PCT Written Opinion of the International Searching Authority for PCT/US2011/054809 dated Jan. 5, 2012.
U.S. Office Action dated Jun. 26, 2012 issued in U.S. Appl. No. 13/252,905.
Response filed Sep. 26, 2012 to U.S. Office Action dated Jun. 26, 2012 issued in U.S. Appl. No. 13/252,905.
Arnold, William, "Phi-RPT0002; CFD Analysis of Large Bubble Mixing." ZIN Technologies, Phi Engineering Support, Jun. 26, 2006.
Phi Pulsed Hydraulics, Inc. Brochure, "Low Cost, Low Energy, Effective and Efficient Mixing." 008 Rev 9/10.
PCT International Search Report for PCT/US2010/052317 dated May 11, 2011.
PCT Written Opinion of the International Searching Authority for PCT/US2010/052317 dated May 11, 2011.
www.waterindustry.org/New%20Projects/zenon-sues-2.htm, "Zenon Files Suit Against US Filter Corporation," search date Mar. 2, 2011.
*Zenon Environmental, Inc. v. United States Filter Corporation*, "Order Construing Claims for U.S. Pat. No. 6,245,239," filed Nov.

(56) References Cited

OTHER PUBLICATIONS 9, 2004 in US District Court, Southern District of California, Civil Action Case No. 03CV1996-B (AJB).
*Zenon Environmental, Inc. v. United States Filter Corporation*, "Order Granting Motion for Summary Judgment for Non-Infringement of Claim 20 of U.S. Pat. No. 6,550,747" filed Feb. 24, 2005 in US District Court, Southern District of California, Civil Action Case No. 03CV1996-B (JFS).
*Zenon Environmental, Inc. v. United States Filter Corporation, now known as Water Applications & Systems Corporation*, "Order Denying Defendant United States Filter Corporation's Motion for Summary Judgment of Invalidity of Asserted Claim 7 of U.S. Pat. No. 6,620,319," filed Mar. 14, 2005 in US District Court, Southern District of California, Civil Action Case No. 03CV1996-B (AJB).
*Zenon Environmental, Inc. v. United States Filter Corporation, now known as Water Applications & Systems Corporation*, "Order Denying Defendant United States Filter Corporation's Motion for Summary Judgment of Invalidity and Non-Infringement of Asserted Claims 1-3 of U.S. Pat. No. 6,245,239," filed Mar. 14, 2005 in US District Court, Southern District of California, Civil Action Case No. 03CV1996-B (AJB).
*Zenon Environmental, Inc. v. United States Filter Corporation*, "Stipulation and Order thereon for Dismissal without Prejudice of Certain Claims Relating to U.S. Pat. No. 6,245,239 and U.S. Pat. No. 6,550,747," filed Nov. 2, 2005 in US District Court, Southern District of California, Civil Action Case No. 03CV1996-B (AJB).
*Zenon Environmental, Inc. v. United States Filter Corporation*, "Order Granting in Part and Denying in Part United States Filter Corporation's Motion for Summary Judgment of Non-Infringement of the Asserted Claims of U.S. Pat. No. 6,620,319," filed Nov. 16, 2005 in US District Court, Southern District of California, Civil Action Case No. 03CV1996-B (AJB).
*Zenon Environmental, Inc.*, Plaintiff-Cross Appellant v. *United States Filter Corporation (now known as Water Applications & Systems Corporation)*, Defendant-Appellant, Opinion decided Nov. 7, 2007 in US Court of Appeals for the Federal Circuit 2006-1266, -1267, Civil Action Case No. 03CV1996-B (AJB).
EPA (U.S. Environmental Protection Agency), Office of Wastewater Management, "Evaluation of Energy Conservation Measures for Wastewater Treatment Facilities," EPA 632-R-10-005, Sep. 1, 2010.
Kippax, Victoria, "Importance of Air Scour in Membrane Bioreactor Systems." www.waterworld.com/index/display/article-display/3887904678/articles/membranes . . . (submission copy printed from internet on Apr. 18, 2012).
Wallis-Lage et al., "Energy Efficient MBR Designs Can Significantly Reduce Operating Costs." Water Environment Federation, WEFTC 2010, pp. 5828-5838.
EPA, Environmental Protection Agency, "Wastewater Management Fact Sheet, Membrane Bioreactors." Sep. 1, 2007.
WE&T, "Using a phased nitrification and identification mode has enable the Bozeman, Mont., wastewater treatment plant to reduce . . . " WE&T www.wef.org/Magazine, Jul. 1, 2010.
WERF, "BASF Donates Nitrogen Removal Patent to WERF".
Zhang et al., "Simultaneous Nitrification and Denitrification in Activated Sludge System Under Low Oxygen Concentration." Frontiers of Environmental Science and Engineering in China 1(1):49-52, Feb. 1, 2007.
Response filed May 8, 2013 to U.S. Office Action dated Nov. 8, 2012 issued in U.S. Appl. No. 13/591,495.
U.S. Office Action dated May 17, 2013 issued in U.S. Appl. No. 13/591,495.
U.S. Office Action dated Aug. 24, 2012 issued in U.S. Appl. No. 12/577,529.
Response filed Jan. 24, 2013 to U.S. Office Action dated Aug. 24, 2012 issued in U.S. Appl. No. 12/577,529.
U.S. Office Action dated Dec. 18, 2012 issued in U.S. Appl. No. 13/591,509.
Response filed Mar. 11, 2013 to U.S. Office Action dated Dec. 18, 2012 issued in U.S. Appl. No. 13/591,509.
Response filed Jun. 18, 2013 to U.S. Office Action dated Dec. 18, 2012 issued in U.S. Appl. No. 13/591,509.
U.S. Office Action dated Jul. 13, 2013 issued in U.S. Appl. No. 13/591,509.
Response filed Nov. 8, 2013 to U.S. Office Action dated May 17, 2013 issued in U.S. Appl. No. 13/591,495.
U.S. Office Action dated Sep. 28, 2015 issued in U.S. Appl. No. 14/198,346.
U.S. Office Action dated Feb. 13, 2015 issued in U.S. Appl. No. 14/147,209.
Response filed Jun. 11, 2015 to U.S. Office Action dated Feb. 13, 2015 issued in U.S. Appl. No. 14/147,209.
Response filed Dec. 14, 2015 to U.S. Office Action dated Feb. 13, 2015 issued in U.S. Appl. No. 14/147,209.
U.S. Office Action dated Mar. 24, 2016 issued in U.S. Appl. No. 14/147,209.
Response filed Apr. 19, 2016 to U.S. Office Action dated Mar. 24, 2016 issued in U.S. Appl. No. 14/147,209.
Response filed Sep. 23, 2016 to U.S. Office Action dated Feb. 13, 2015 issued in U.S. Appl. No. 14/147,209.
Response filed Mar. 28, 2016 to U.S. Office Action dated Sep. 28, 2015 issued in U.S. Appl. No. 14/198,346.
U.S. Office Action dated Sep. 20, 2017 issued in U.S. Appl. No. 15/429,986.
Response filed Mar. 20, 2018 to U.S. Office Action dated Sep. 20, 2017 issued in U.S. Appl. No. 15/429,986.
U.S. Office Action dated Jul. 3, 2018 issued in U.S. Appl. No. 15/429,986.
U.S. Office Action dated Nov. 27, 2017 issued in U.S. Appl. No. 15/209,557.
U.S. Office Action dated Jul. 3, 2018 issued in U.S. Appl. No. 15/209,557.
Response filed May 29, 2018 to U.S. Office Action dated Nov. 27, 2017 issued in U.S. Appl. No. 15/209,557.
Wareham, D. G., et al., "Real-Time Control of Wastewater Treatment Systems using ORP," Wat. Sci. Tech., 1993, pp. 273-282, vol. 28 No. 11-12, Pergamon, Great Britain.
U.S. Office Action dated May 4, 2020 issued in U.S. Appl. No. 16/148,957.
U.S. Office Action dated Jun. 18, 2020 issued in U.S. Appl. No. 16/148,968.
U.S. Office Action dated Jul. 13, 2020 issued in U.S. Appl. No. 16/239,207.
"Choked flow" Wikipedia published Oct. 30, 2015 accessed at <https://en.wikipedia.org/w/index.php?title=Chokedflow&oldid=688180888> (Year: 2015).
"Flow measurement" Wikipedia published Dec. 17, 2015 accessed at <https://en.wikipedia.org/w/index.php?title=Flowmeasurement&oldid=695609203#Pressure-based meters> (Year: 2015).
U.S. Office Action dated Nov. 27, 2020 issued in U.S. Appl. No. 16/148,957.
Response filed May 27, 2021 to U.S. Office Action dated Nov. 27, 2020 issued in U.S. Appl. No. 16/148,957.
U.S. Office Action dated Jun. 23, 2021 issued in U.S. Appl. No. 16/148,957.
Response filed Nov. 6, 2020 to U.S. Office Action dated Jul. 13, 2020 issued in U.S. Appl. No. 16/239,207.
U.S. Office Action dated Feb. 18, 2021 issued in U.S. Appl. No. 16/239,207.
U.S. Office Action dated Jul. 2, 2021 issued in U.S. Appl. No. 16/938,064.
U.S. Office Action dated Nov. 25, 2020 issued in U.S. Appl. No. 16/148,968.
Response filed May 25, 2021 to U.S. Office Action dated Nov. 25, 2020 issued in U.S. Appl. No. 16/148,968.
U.S. Office Action dated Jun. 23, 2021 issued in U.S. Appl. No. 16/148,968.
Response to Non-Final Office Action filed Feb. 24, 2022 to U.S Office Action dated Aug. 24, 2021 issued in U.S. Appl. No. 16/239,207.
Response to Non-Final Office Action filed Dec. 23, 2021 to U.S. Office Action dated Jul. 2, 2021 issued in U.S. Appl. No. 16/938,064.

(56) References Cited

OTHER PUBLICATIONS

Response to Non-Final Office Action filed Dec. 23, 2021 to U.S. Office Action dated Jun. 23, 2021 issued in U.S. Appl. No. 16/148,957.
Final Office Action dated Apr. 12, 2022 issued in U.S. Appl. No. 16/148,957.
Response to Non-Final Office Action filed Dec. 23, 2021 to U.S. Office Action dated Jun. 23, 2021 issued in U.S. Appl. No. 16/148,968.
Final Office Action dated Apr. 12, 2022 issued in U.S. Appl. No. 16/148,968.
Response filed Nov. 2, 2020 to U.S. Office Action dated May 4, 2020 issued in U.S. Appl. No. 16/148,957.
Response filed Oct. 16, 2020 to U.S. Office Action dated Jun. 18, 2020 issued in U.S. Appl. No. 16/148,968.
Response to Final Office Action filed Aug. 17, 2021 to U.S. Office Action dated Feb. 18, 2021 issued in U.S. Appl. No. 16/239,207.
U.S. Office Action dated Nov. 8, 2012 issued in U.S. Appl. No. 13/591,495.
Response to Non-Final Office Action filed Apr. 8, 2020 to U.S. Office Action dated Oct. 18, 2019 in U.S. Appl. No. 16/239,236.

* cited by examiner

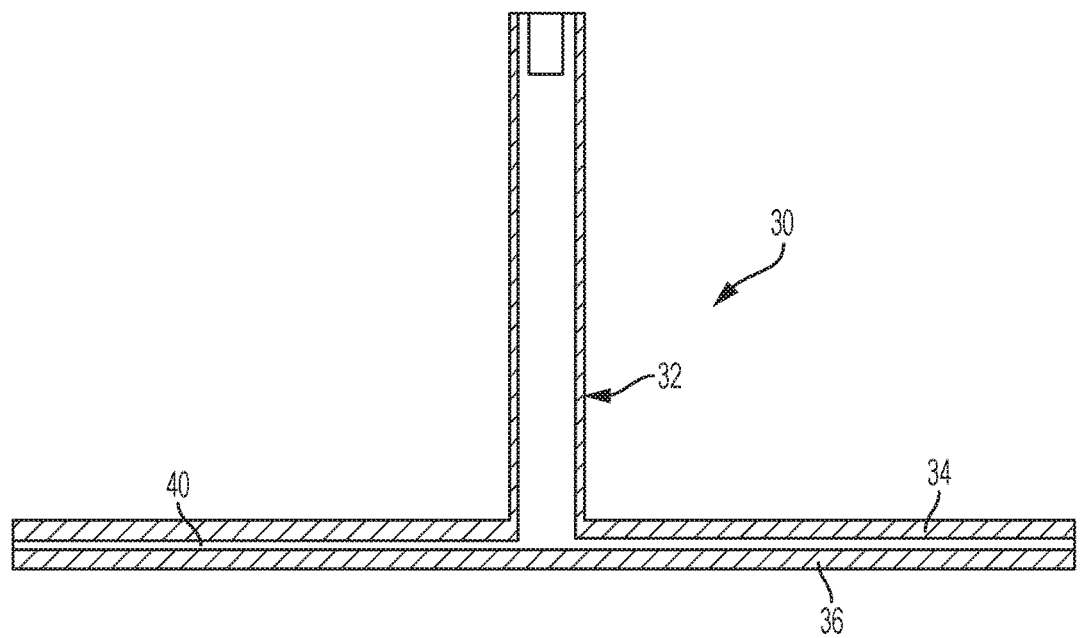
FIG. 6A
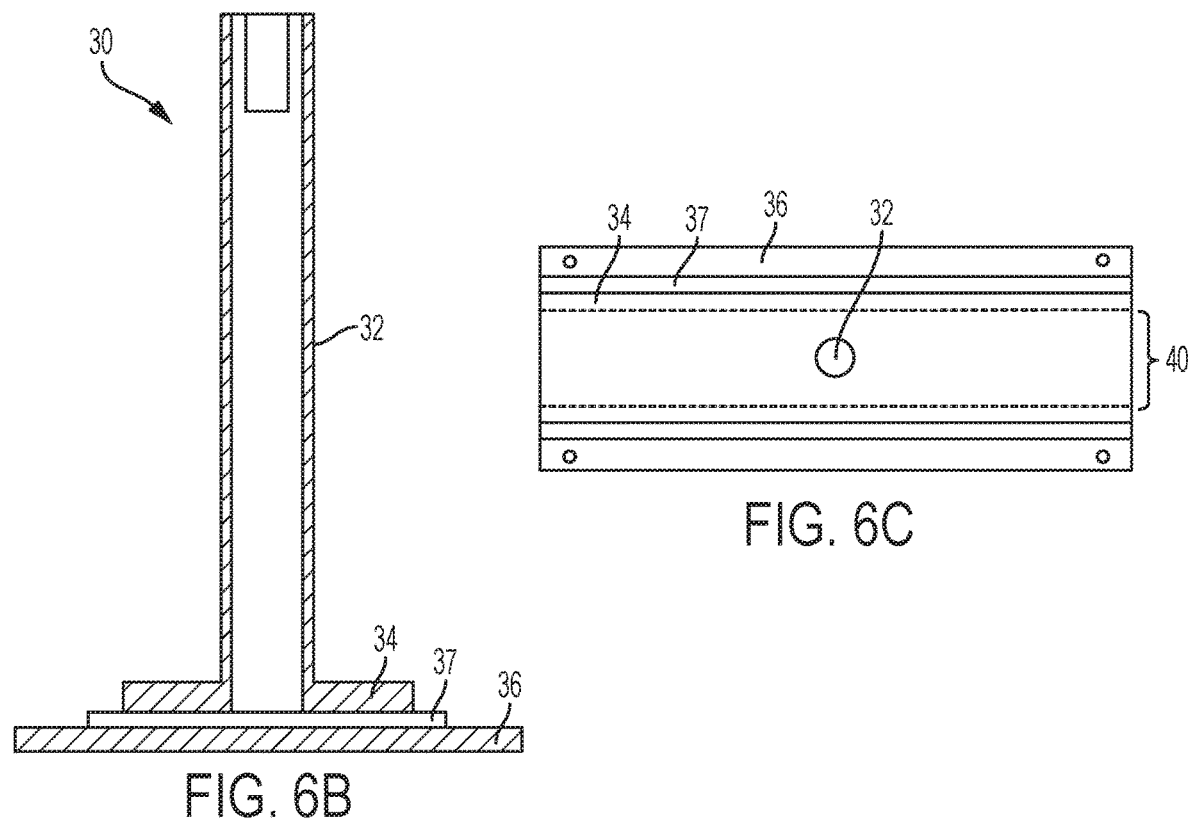
FIG. 6B
FIG. 6C

SYSTEMS AND METHODS FOR TREATMENT PROCESSES

CROSS-REFERENCE TO RELATED APPLICATION

This application claims priority to U.S. Provisional Patent Application No. 62/565,833, filed Sep. 29, 2017, wherein the contents of the foregoing is incorporated herein in its entirety by reference.

FIELD OF THE INVENTION

The present invention relates to control systems and methods, particularly systems and methods for implementing and controlling mixing and aeration processes, such as in wastewater treatment.

BACKGROUND

Methods and systems for treating wastewater are known in the art. Such methods may include aerobic, anoxic, and anaerobic processes.

SUMMARY OF THE INVENTION

The present invention includes systems and methods as described herein.

The present invention may be better understood by reference to the description and figures that follow. It is to be understood that the invention is not limited in its application to the specific details as set forth in the following description and figures. The invention is capable of other embodiments and of being practiced or carried out in various ways.

BRIEF DESCRIPTION OF THE DRAWINGS

These and other features, aspects, and advantages of the present invention are better understood when the following detailed description is read with reference to the accompanying drawings, wherein:

FIGS. 6A-6C are detailed views of an embodiment and its components of an exemplary nozzle in conjunction with an embodiment of the present invention;

Figure 1:
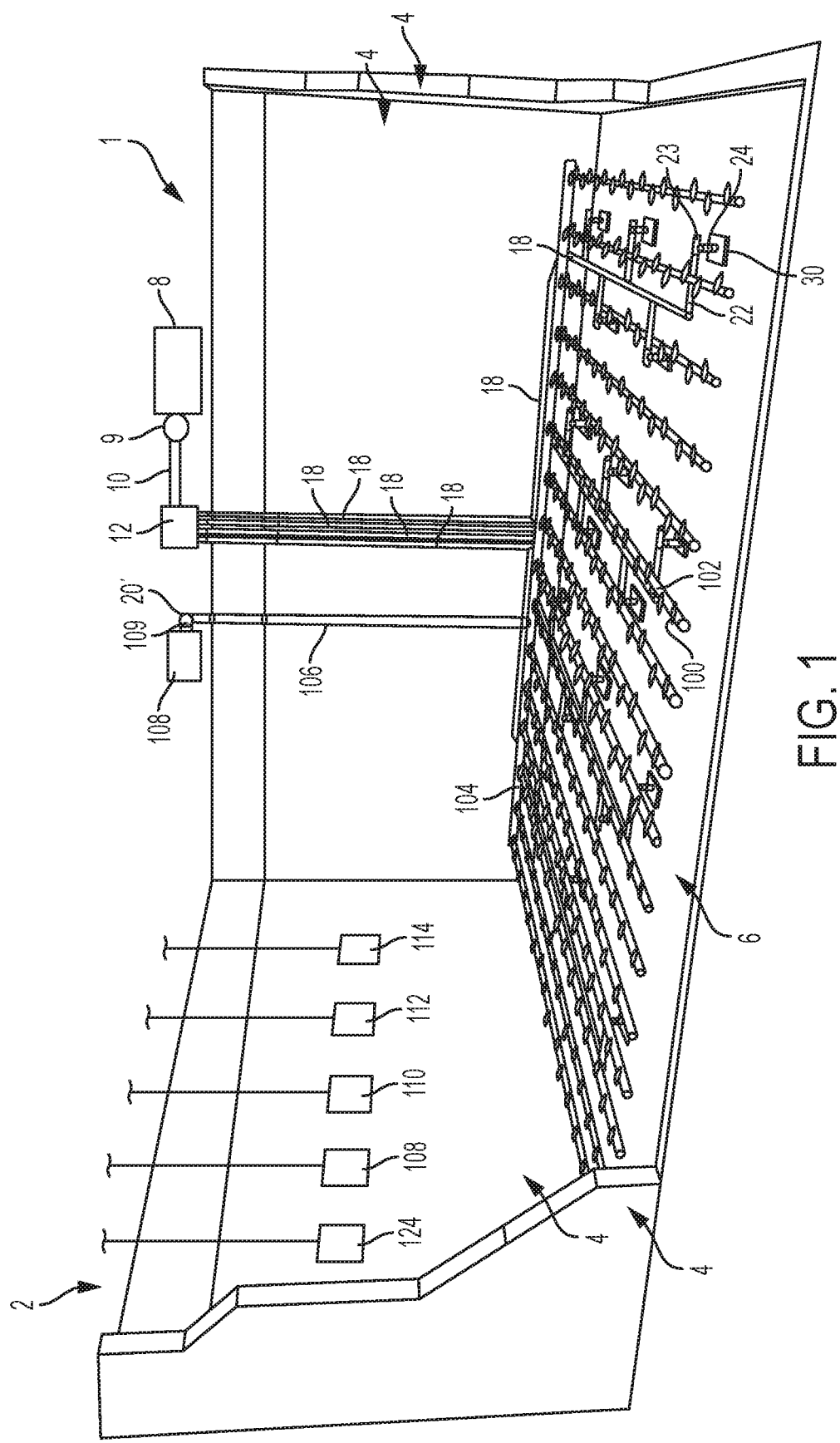
FIG. 1 is a side cut-away view of a basin with mixing and aeration components for use in conjunction with an embodiment of the present invention.

Repeat use of reference characters in the present specification and drawings is intended to represent same or analogous features or elements of the invention.

DETAILED DESCRIPTION OF EXEMPLARY EMBODIMENTS

Reference will now be made in detail to various embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Systems and methods of the present invention may be used in connection with various treatments or storage of substances. By way of example, the embodiments of the present invention may be utilized in the treatment of wastewater, such as in aerobic, anaerobic, and anoxic wastewater treatment phases. In other applications, may be used in storing substances. One of ordinary skill in the art will appreciate that such uses are for illustrative purposes only and are not intended to limit the full scope of the invention disclosed herein.

Referring to FIG. 1, a cut-away perspective view of an exemplary wastewater treatment mixing system 1 is shown. The system 1 includes a containment unit for wastewater, which is shown in FIG. 1 as basin 2 having four sidewalls 4 and a bottom 6. One of ordinary skill in the art will appreciate that alternative types of containment units, such as tanks, vessels, channels, lagoons and ditches, are also within the scope of the present invention. The containment unit may additionally have an inlet through which wastewater enters and an outlet through which the treated wastewater exits. In some embodiments, the containment unit may allow for continuous flow of the wastewater whereas other embodiments may restrict the flow of the wastewater. In some embodiments, multiple containment units, of the same type or of differing types, may be present and connected such that the wastewater passes through them sequentially or not connected such that wastewater passes thru them in parallel. The remaining components of the wastewater treatment mixing system 1 of the present invention are shown in more detail in additional figures and described therewith.

With further reference to FIG. 1, a source of compressed air is shown outside of basin 2 as a compressor 8, although the placement of compressor 8 can be in any suitable location for a particular application. Compressor 8 is connected to supply line 10, which feeds into a controller box 12. A conventional regulator 9 or a throttling valve (not shown) may be placed along the supply line to regulate the pressure or flow rate of pressurized gas from the compressor 8. In other embodiments, any suitable pressure or flow rate control device may be utilized. In the depicted embodiment, controller box 12 is located outside of basin 2, but it is understood that the precise placement of controller box 12 may vary.

Figure 2A:
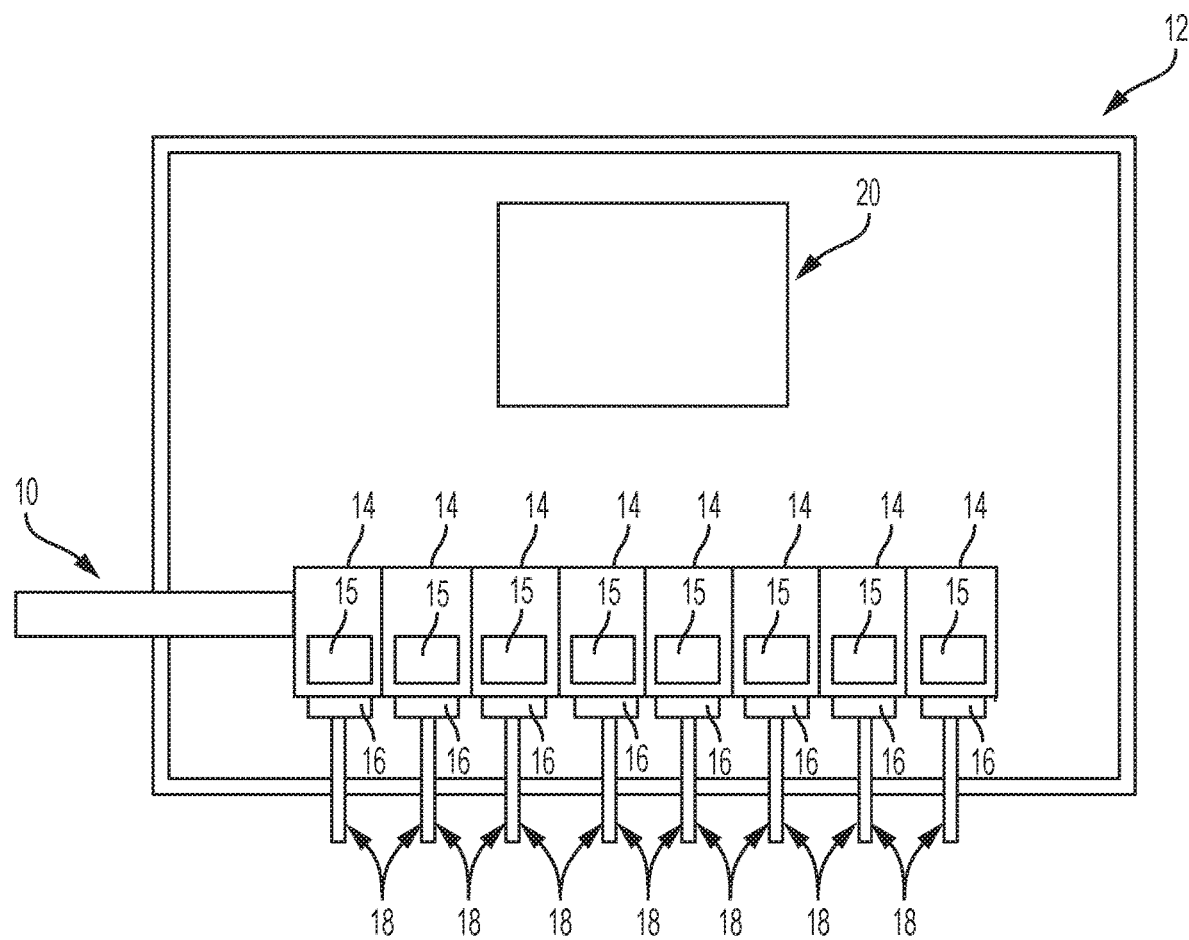
FIG. 2A is a front cutaway view of a controller box for an exemplary embodiment of the present invention.

Controller box 12 is shown in further detail in FIG. 2A, in which, in the particular embodiment depicted, controller box 12 includes eight valves 14 with each having a solenoid valve 16. In some embodiments, alternative types of valves or flow control devices may be used as an alternative to solenoid valves 16. Valves 14 are connected with supply line 10. Each valve 14 has an exhaust pressure sensor 15 that is in communication with a programmable logic controller (PLC) 20. Each pressure sensor 15 provides a signal to the PLC 20 each time the valve 14 to which it is attached opens and closes. If the signals do not fall within a predetermined range, the PLC 20 generates a fault signal to the plant process control system (not shown) or to the operator. In this manner, mixing system 1 includes an alert for certain malfunctions, such as when a valve 14 is stuck open or stuck closed. PLC 20, which can include a memory (not shown) and a processor (not shown), is also capable of selectively opening and closing each valve 14 located in controller box 12. In other embodiments, systems may also be utilized in the context of this invention that use manual manipulation of valves instead of the computerized control system described above.

Figure 2B:
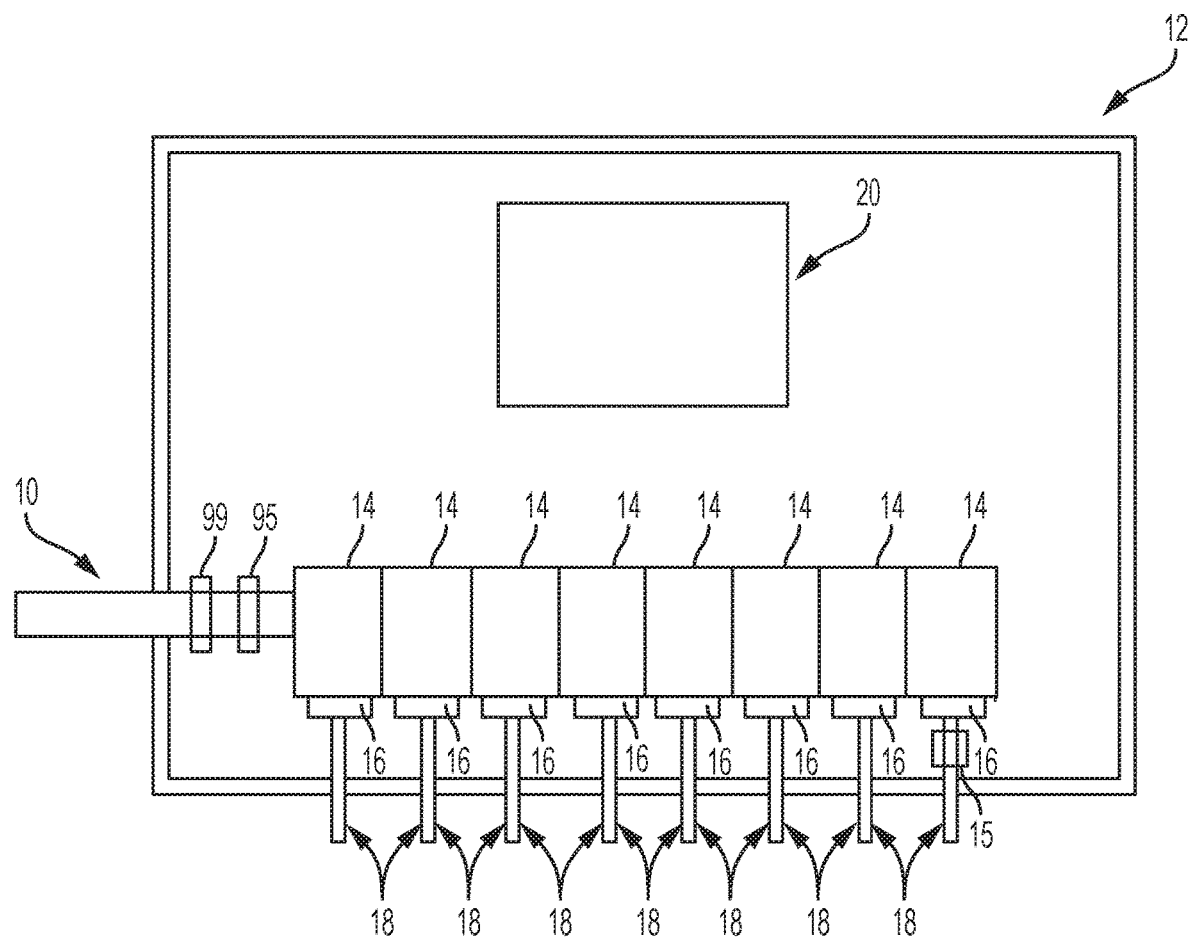
FIG. 2B is a front cutaway view of a controller box for an alternative exemplary embodiment of the present invention.

In an alternative embodiment, as shown in FIG. 2B, controller box 12 is again shown with eight valves 14 with each having a solenoid valve 16. Valves 14 are connected with supply line 10. Electronic throttle valve 99 and pressure sensor 95 are located in connection with supply 10 inside controller box 12. In addition, pressure sensor 15 is located inside controller box 12 on a single header 18. In alternative embodiments, a plurality of headers or all headers may have a pressure sensor 15. In addition, any components shown inside controller box 12 could alternatively be located on its exterior.

Figure 3A:
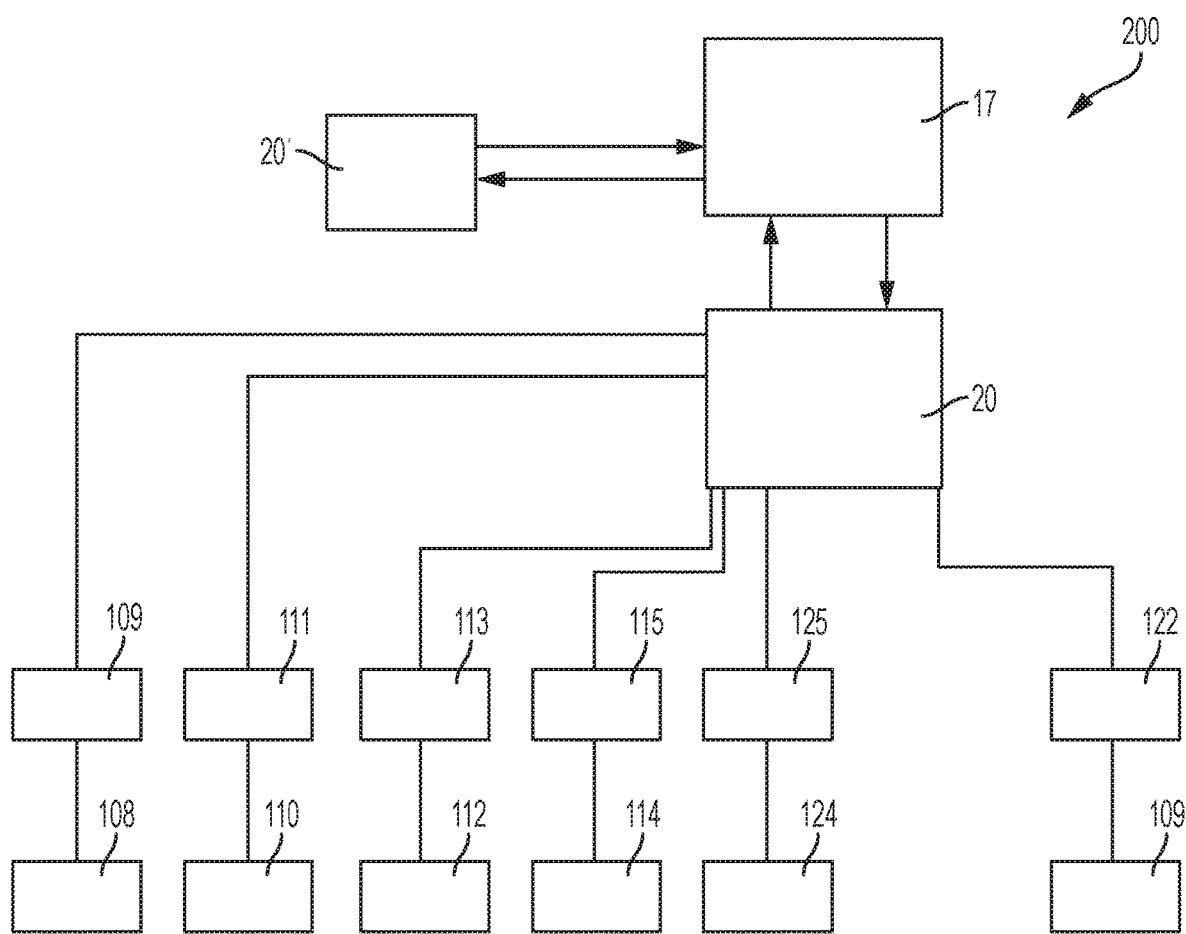
FIG. 3A is a schematic diagram showing components of a control system an embodiment of a system of the present invention.

As shown in FIG. 3A, each of programmable logic controller (PLC) 20 and programmable logic controller (PLC) 200 is in communication with control panel 17. As used herein, reference to "in communication with" indicates that data and/or signals are transferable between the referenced components, and such reference includes both physical connections and wireless connections. In addition, "in communication with," whether used in connection with data or otherwise, also includes embodiments in which the referenced components are in direct connection (i.e., directly connected to each other with a cable) as well as indirect connections, such as when data is transmitted through an intermediate component and either relayed in the same format or converted and then relayed to the referenced component.

Figure 3B:
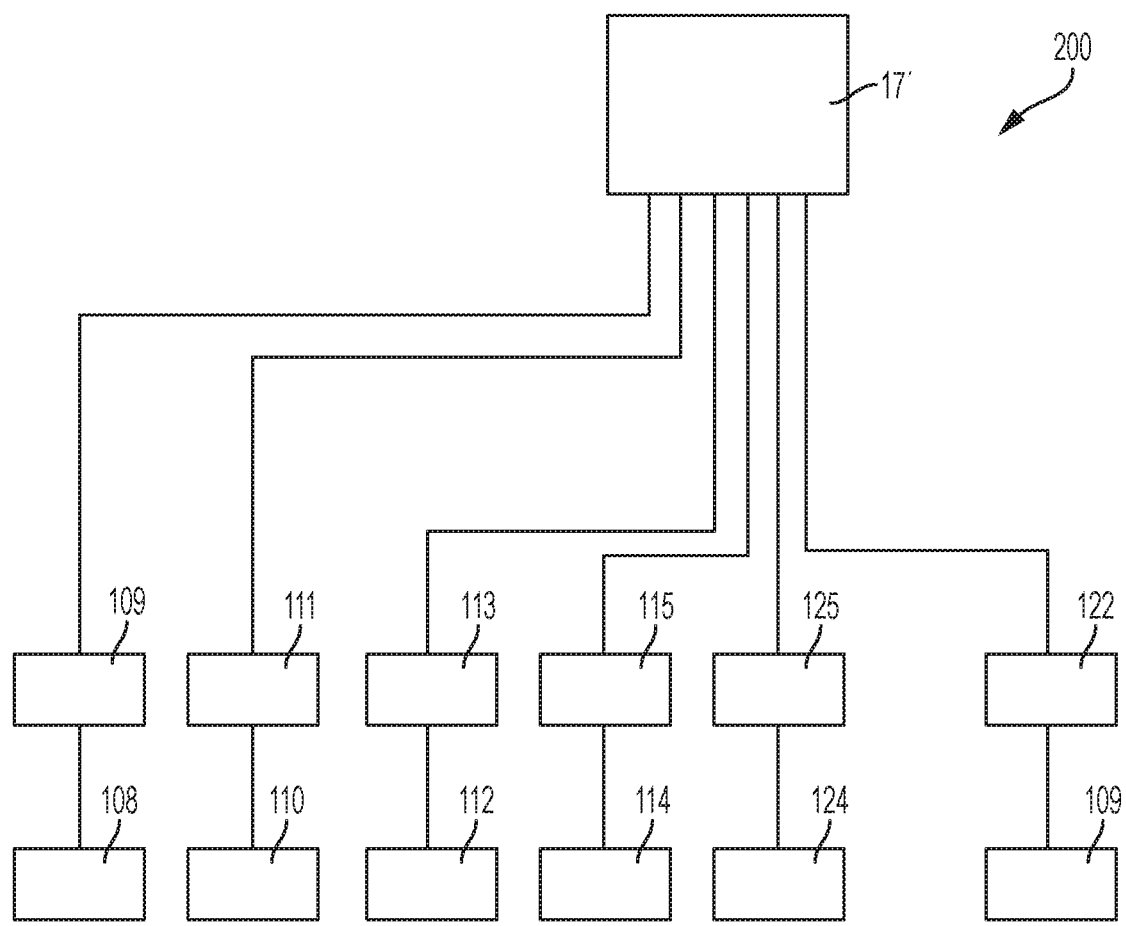
FIG. 3B is schematic diagram showing components of an alternative control system an embodiment of a system of the present invention.

In some embodiments, an alternative configuration may be present other than shown in FIG. 3A. For example, in some embodiments, a PLC may not be present or may be present in an alternative configuration. In addition, in some embodiments PLC 20 and control panel 17 may be combined within a single device. For example, in FIG. 3B, a single control panel 17' is shown that may optionally include all of the functions discussed herein for control panel 17, PLC 20, and PLC 200. In addition, in some embodiments, control panel 17 may not include a PLC. In other embodiments, more than one control panel 17 and/or more than one PLC 20 may be present. Although not shown, control panel 17 or control panel 17' may also be in communication with solenoid valve 16, pressure sensor 15, pressure sensor 95, and/or electronic throttle valve 99.

In some embodiments, control panels used for the present invention may include any machine having processing capacity, such as, by example, a machine having a processor, a memory, and an operating system. In some embodiments, control panel 17 may include an interface for inputting such manual instruction. By way of example, and without limitation, control panels may include one or more of a personal computer, handheld computer, microcontroller, PLC, smartphone, and/or tablet. In still other embodiments, control panel 17 may be any device capable of controlling the operation of a mixing system, such as a timer.

In some embodiments, control panel 17 may be located within controller box 12, in its proximity, or at a remote location, such as within a treatment facility or another site. In addition, an existing facility may have existing PLCs or control panels or hardware such as mixers and aerators, and the present invention could be interfaced with those existing systems, such as by loading software to perform the processes described herein and communicate with the previously-existing structures. Furthermore, as noted, control panel 17 may be remotely accessible, and it may be configured to a network or internet connection. In addition, in some embodiments, control panel 17 and/or PLC 20 may be connected to a wireless and/or wired network. In addition, control panel 17 may permit an operator to manually control the processes and system components, such as manually overriding the automatic control and activating or deactivating aeration to the wastewater.

Referring again to FIG. 3A, PLC 20 is also in communication with and receives input from ORP probe processor 109, nitrate probe processor 111, ammonia probe processor 113, DO probe processor 115, and pH probe processor 125. In other embodiments, some or all of ORP probe 108, nitrate probe 110, ammonia probe 112, DO probe 114, and pH probe 124 may be in communication with a single probe processor. Other probes may alternatively or additionally be utilized, such as, without limitation, level sensors, flow meters, total suspended solids probes, or any device providing information about the system and/or content of the containment unit. In other alternative embodiments, a probe processor may be omitted for some or all probes and some or all probes may be in direct communication with PLC 20 without a probe processor. However, as noted above, alternative configurations may be present in other embodiments.

Referring again to FIG. 1, system 1 further includes four supply headers 18 made of polyvinyl chloride (PVC), acrylonitrile butadiene styrene (ABS), chlorinated polyvinyl chloride (CPVC), fire retardant polypropylene (FRPP), or stainless steel piping, wherein each supply header 18 is connected to a valve 14 in controller box 12. Supply headers 18 extend from controller box 12 toward bottom 6 of basin 2. Supply headers 18 also extend in a pattern parallel with bottom 6 in an arrangement in which they are at substantially equally-spaced intervals. As apparent to an ordinary artisan, supply headers 18 can be made of a single, continuous component or, in an alternative embodiment, supply headers 18 can be constructed from multiple components joined by conventional measures, such as welding, adhesive, threading, bending, use of a connector, or other known measures or combinations thereof. In addition, the headers, as well as all of the piping in this system, can be of any construction and material that meets the particular needs of the mixing system. For example, the piping can be made from plastic, galvanized steel, stainless steel, carbon steel, copper, ABS, PVC, FRPP, CPVC, or any other material from which piping is typically formed and which meets the requirements of the particular system. It should also be appreciated that in other embodiments, the location of supply headers 18 can be varied. By way of example, headers 18 can run above basin 2. In addition, one or more headers may be placed in distinct locations, such as entering basin 2 at different points.

Figure 4:
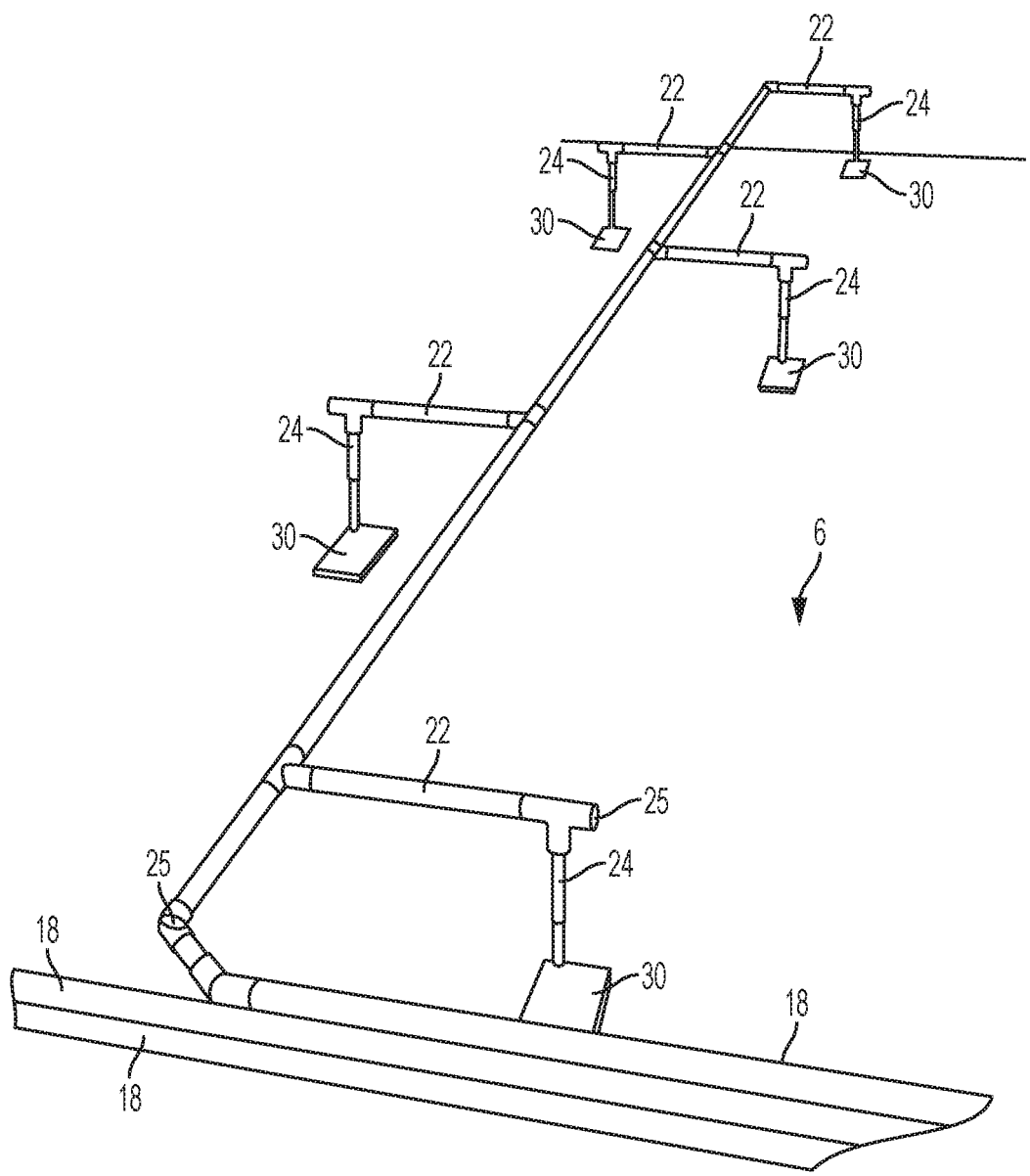
FIG. 4 is a detailed view of certain components of the embodiment shown in FIG. 1.
Figure 5A:
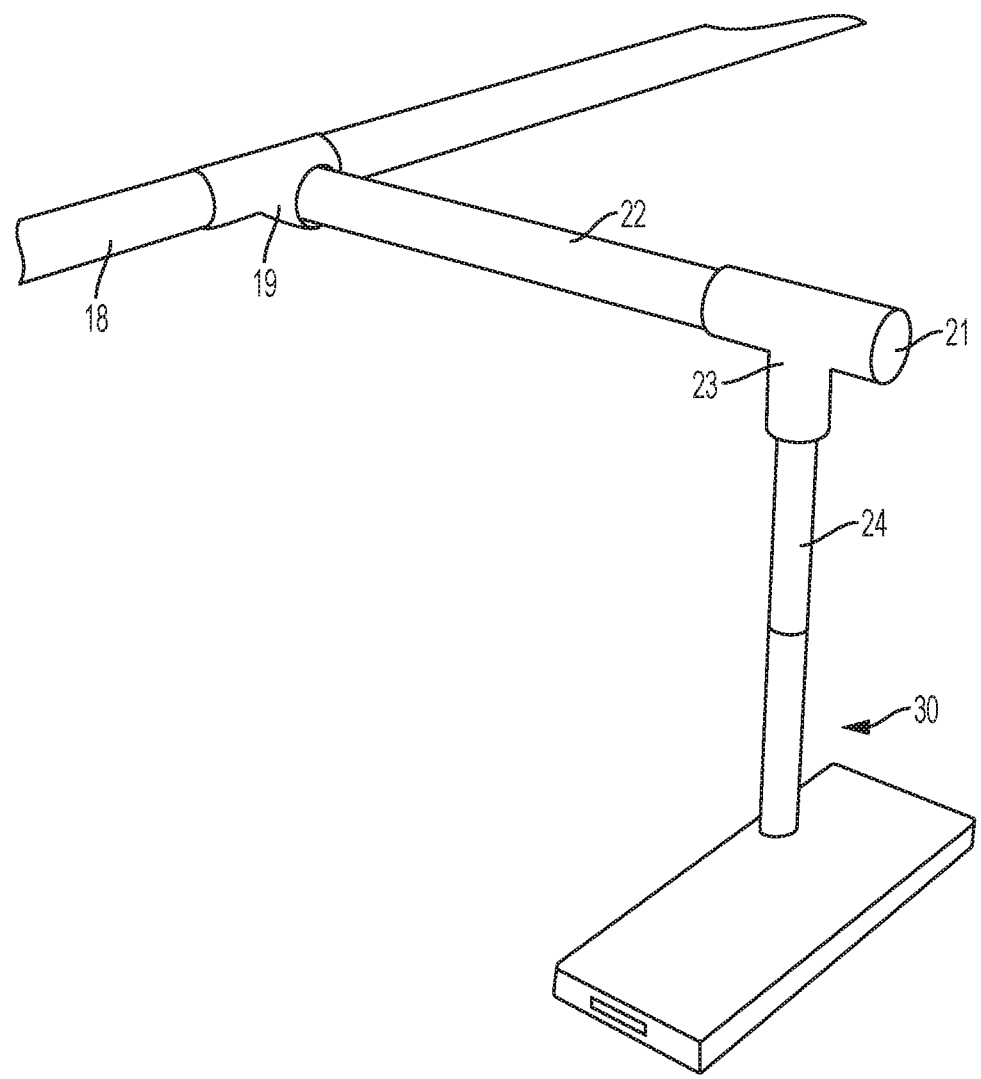
FIG. 5A is a detailed view of certain components of the embodiment shown in FIGS. 1 and 4.
Figure 5B:
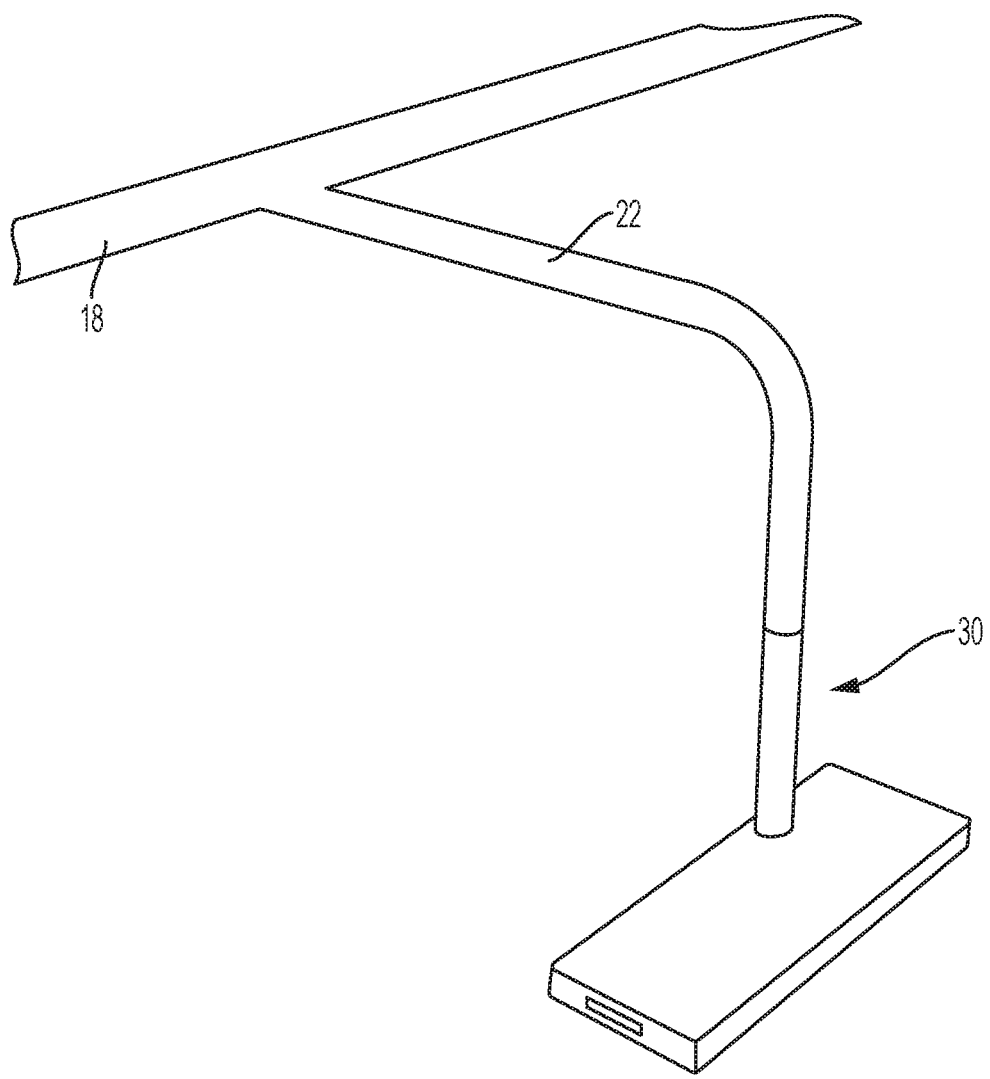
FIG. 5B is a detailed view of certain components of an alternative embodiment of the configuration shown in FIG. 5A.

In the embodiment depicted in FIG. 1, and as also shown in more detail in FIGS. 4-5A, each of the supply headers 18 has a first line 22 that extends substantially perpendicular from each supply header 18 and that are substantially parallel to bottom 6. It is understood that first lines 22 can extend at different angles in other embodiments. As seen in FIGS. 4 and 5A, first lines 22 are connected to supply header 18 using a T-type connector 19 with cap 21 sealing the unconnected branch, although any conventional means for connecting can be employed and such means are readily known to a person having ordinary skill in the art. Alternatively, for example, supply header 18 can be integral to first line 22 or welded, bonded, or otherwise connected thereto either with or without a connector of any suitable type. In still another embodiment, header 18 and first line 22 may be joined by a coupling, such as a threaded coupling, wherein such a coupling may optionally include an orifice as discussed below. In still other embodiments, as shown in FIG. 5B, a single first line 22 may be present, optionally having an L-shape in order to provide the same design as that shown in FIG. 5A but using a single, integral first line 22 that is bent or curved to provide an L-shape or elbow instead of connecting first line 22 and second line 24 to obtain that shape shown in FIG. 5A. Although first lines 22 are depicted in a staggered layout, i.e., each first line 22 extends in the opposite direction from the previous and subsequent first lines 22, other layouts are within the scope of the present invention. Although, certain advantages may be achieved with the particular layout depicted in the figures hereof.

In some embodiments of the present system, first lines 22 and second lines 24 each have an inner diameter that is smaller than the inner diameter of supply header 18 to which they are in communication. In some embodiments, first lines 22 have an inner diameter equal to the inner diameter of the supply header 18 to which it is connected, and the corresponding second lines 24 has a smaller inner diameter. In addition, some embodiments may not include a first line 22, and second line 24 may connect to supply header 18. As indicated, second line 24 may be a vertical pipe or line extending from first line 22. However, in some embodiments, either first line 22 or second line 24 may be omitted or alternative configurations may be employed without departing from the scope of the present invention.

In still other embodiments, headers 18 may extend across a containment unit, such as basin 2, above the basin, at the surface level of the basin, immediately under the surface level of the basin, or near the top area of the basin. In some embodiments, headers 18 may be submerged within a solution, such as wastewater in basin 2, and in other embodiments headers 18 may be above such solution. In similar fashion first lines 22 and/or second lines 24 may be configured accordingly to position nozzles 30 within basin 2, such as at or near bottom 6 of basin 2. In some instances, such embodiments may offer benefits such as ease of interchangeability of components (such as nozzles), ease of access to headers for maintenance or replacement, and other potential benefits.

Figure 11A:
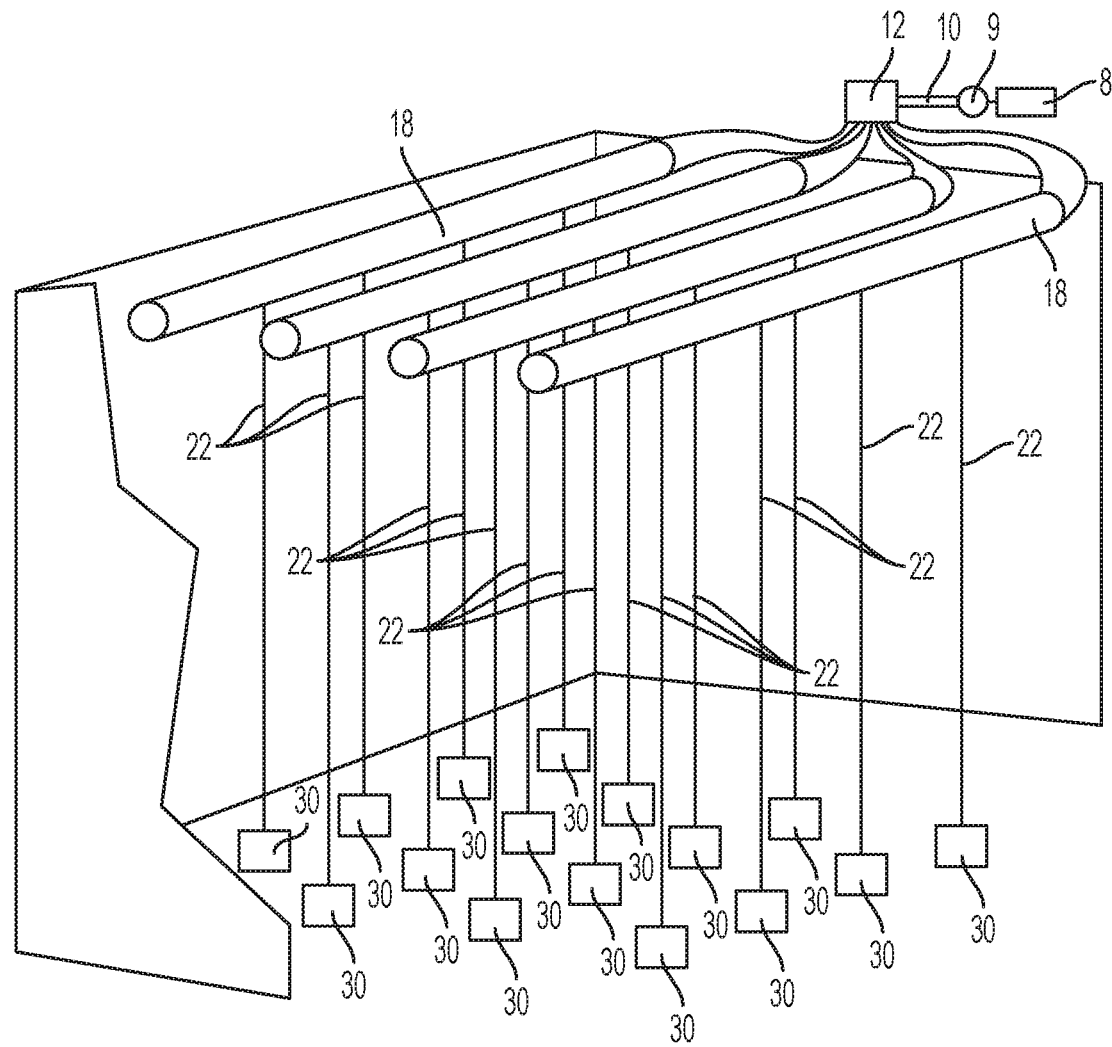
FIG. 11A is a view of an alternative embodiment of a basin with mixing components for use in conjunction with an embodiment of the present invention.

By way of example, FIG. 11A illustrates an embodiment in which headers 18 extend at, near, or above the surface level of basin 2. Such headers may optionally be secured using any suitable type of bracings or brackets. In some embodiments, headers located at, near, or above the surface level of a containment unit may be located near an edge of such unit, thereby rendering it more easily accessible First lines 22 extend vertically downward to connect header 18 to respective nozzles. Valves 28, which may be any suitable type to control or stop flow, are located on first line 22. In other embodiments, additional lines may be present between header 18 and a nozzle 30. In some embodiments, first lines 22 may be removably connected to header 18, and nozzle 30 may be removably coupled to first line 22. In this manner, by way of example, first line 22 may be disconnected from header 18 and removed, along with attached nozzle 30, thereby making first line 22 and nozzle 30 accessible for maintenance, servicing, or any other purpose. Components for aeration, such as shown in FIG. 1 may also be present but are not illustrated.

Figure 11B:
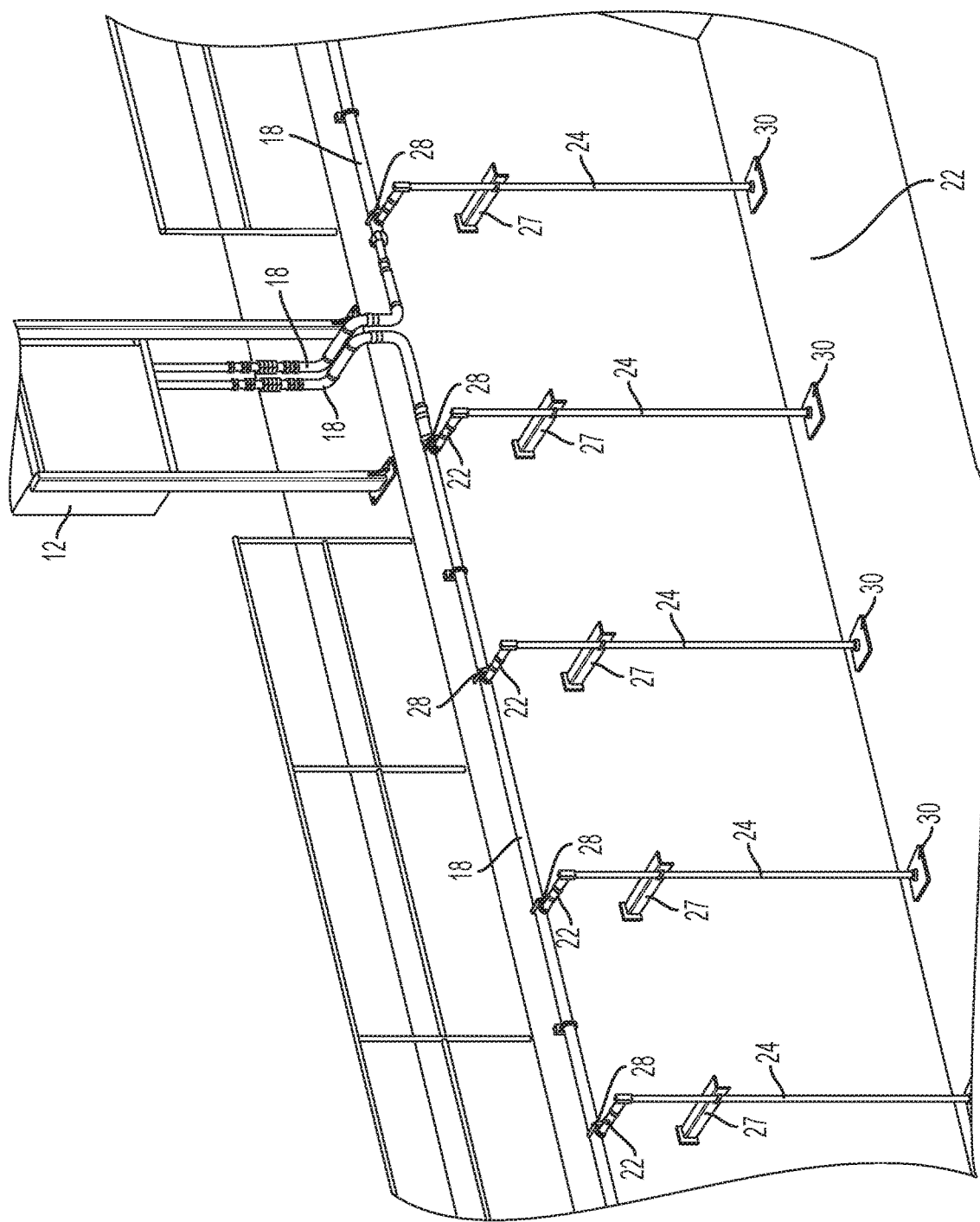
FIG. 11B is a view of an additional alternative embodiment of a basin with mixing components for use in conjunction with an embodiment of the present invention.
Figure 11C:
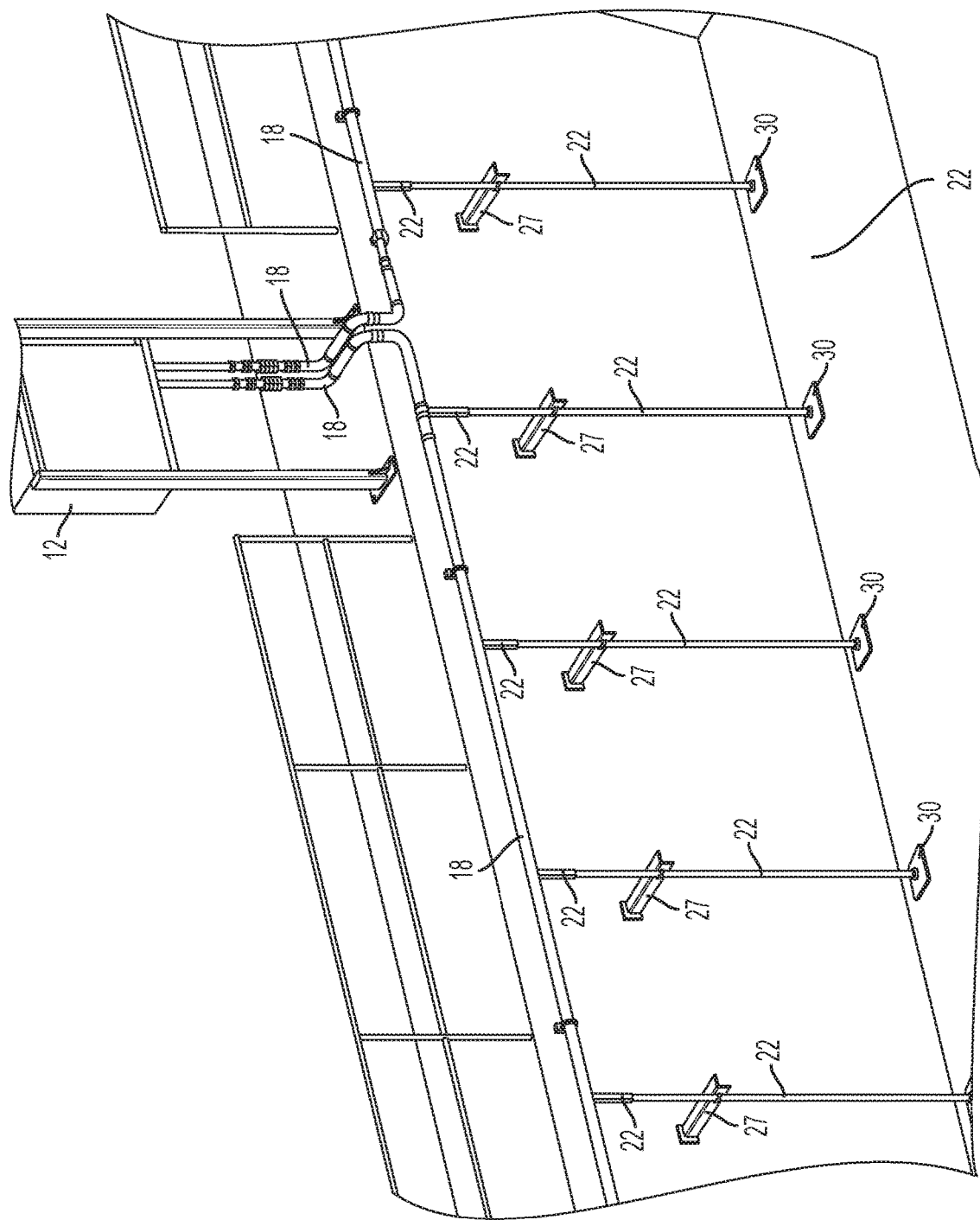
FIG. 11C is a view of an additional alternative embodiment of a basin with mixing components for use in conjunction with an embodiment of the present invention

In alternative embodiments, such as shown in FIG. 11B, headers 18 may connect, directly or indirectly, to a single nozzle 30. As shown, header 18 is secured to a wall of basin 2 using brackets 27. Nozzle 30 is connected to header 18 via second line 24 (extending vertically in basin 2) and first line 22 (extending horizontally in basin 2). In some other embodiments, such as shown in FIG. 11C, first line 22 may extend vertically downward from a header to connect to a nozzle without any second line. In such embodiments such as in FIG. 11C, a vertically downward connector (not shown) may be present to connect header 18 to first line 22, and such a connector may have a valve such that flow may be restricted or stopped to first line 22, such as if were desired to remove first line 22 for maintenance or service.

With respect to the embodiments of FIGS. 11B-11C, the embodiment of FIG. 11B, the connection of a header to a single nozzle allows in a different manner for localized varying mixing intensity within a basin, wherein flow to a specific nozzle or group of nozzles may be controlled in the same manner as described above. In addition, single nozzles may be isolated and flushed with liquid, or alternatively pressurized or mechanically rodded, such as to clear blockages. In addition, in any embodiment relating to FIG. 11A-11C, a removable cap, such as described above, may be located near a first line or second line to allow for maintenance or inspection.

In some embodiments, headers 18, first lines 22, and/or any other gas or aeration lines, or any connector associated therewith, may have a removable cap 25. Such a removable cap, which may be threaded or otherwise securely attachable and detachable, permits the removal to access the interior of a pipe or line, such as for easy cleaning or debris removal from the system. In some embodiments, such removable caps 25 may be present at one or more distal ends of a header 18 and/or first line 22. In addition, in some embodiments a particular header 18 and/or first line 22 may have more than one removable cap 25. In addition, in some embodiments, a connector between any of header 18, first lines 22, or second line 24—such as T-Type connector 19 or T-type connector 23—may have an additional opening (not shown) that has a removable cap. Exemplary illustrations for positioning removable caps 25 are shown in FIG. 4.

Attached to each first line 22 is a second line 24, which extends in the same general direction as sidewalls 4. As shown in FIGS. 1 and 3, each second line 24 is connected to a nozzle 30 at the distal end of second line 24 opposite the supply header 18. The connection between second line 24 and nozzle 30 can be made by any conventional measures, such as those discussed above. It is understood that in other embodiments, the second line 24 can extend at different angles. In the depicted embodiment, as shown in FIG. 4, first line 22 and second line 24 are connected using a T-type connector 23 and are generally at a 90° angle with respect to one another.

Any suitable types of nozzles may be used in connection with the present invention. By way of example, nozzles disclosed in U.S. Pat. No. 8,508,881, which is incorporated herein in its entirety by reference, may be utilized. An illustrative nozzle is shown in FIGS. 6A-6C as nozzle 30. As shown in this illustrative embodiment, nozzle 30 includes nipple 32, which is hollow to permit gas flow, an upper plate 34, a lower plate 36, and spacer 37. Upper plate 34 and lower plate 36 are parallel to each other and are spaced apart by spacer 37 such that channel 38 is formed between them, wherein channel 38 has outlets 40 at each distal end.

Figure 8A:
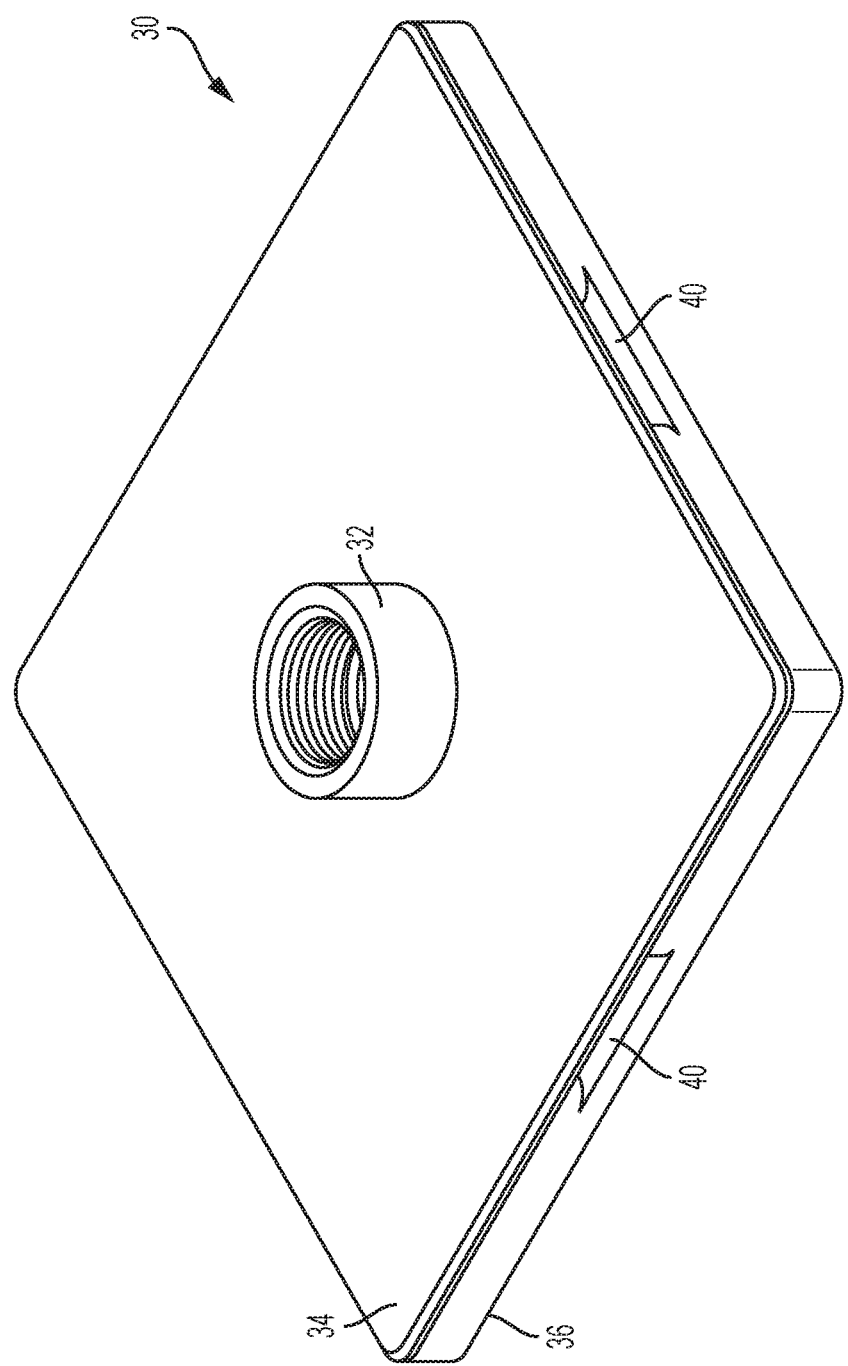
FIG. 8A is a view of an alternative embodiment of a nozzle of the present invention.
Figure 8B:
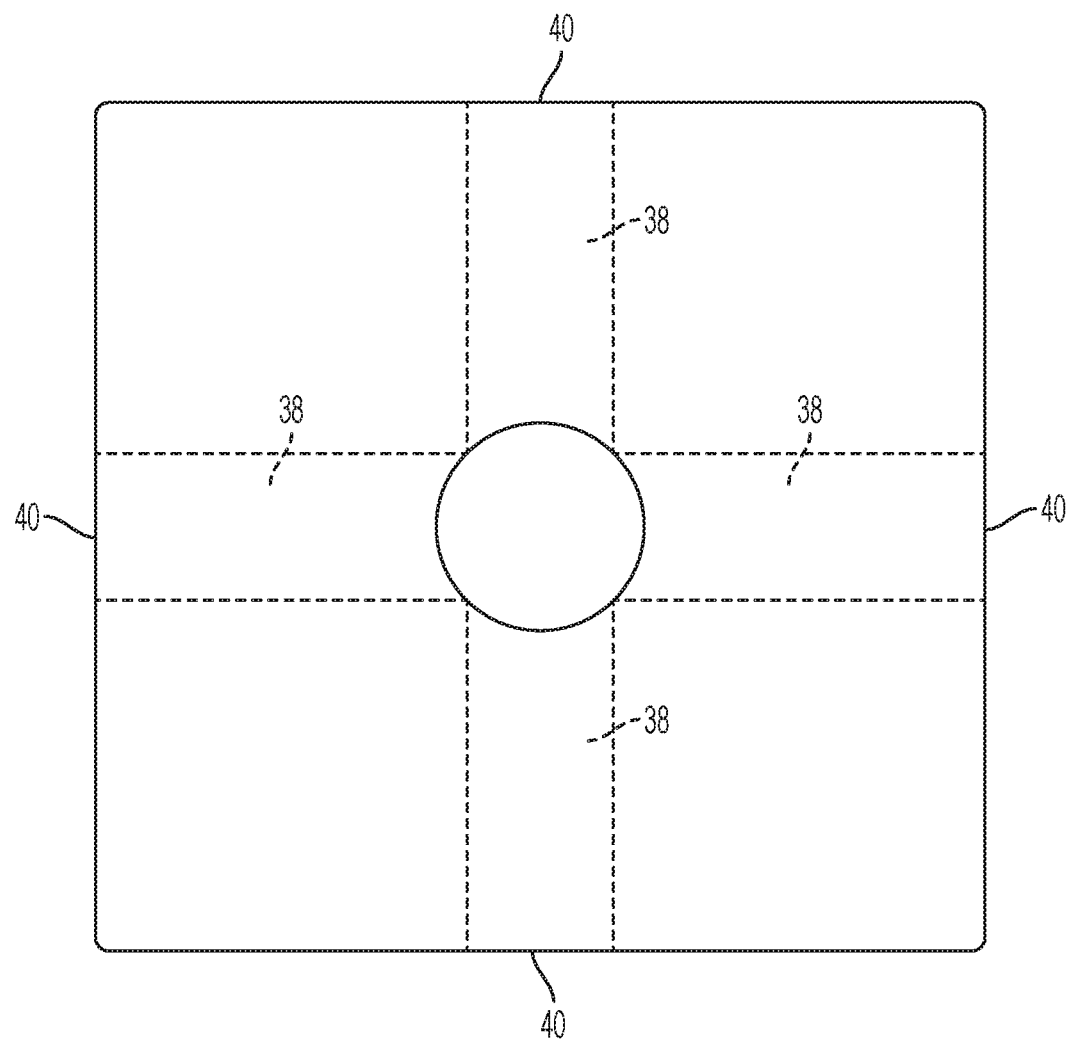
FIG. 8B is a top view of the nozzle of FIG. 8A.

In other embodiments, multiple channels are present, wherein each channel may have an outlet at each distal end. By way of example, one embodiment of a nozzle of the present invention has a nipple that connects with three channels, wherein each channel has an outlet at each distal end. In yet another exemplary embodiment, as shown in FIGS. 8A and 8B, a nozzle 30 may have two channels 38 forming a cross configuration with each channel having an outlet 40 at each distal, thus providing four outlets 40. Nozzle 30 may be constructed in any suitable manner, including optionally in a similar manner to nozzle 30 by using a nipple 32, an upper plate 34, and a lower plate 36.

One of ordinary skill in the art will appreciate that alternative constructions may be used to provide nozzles having channels and outlets as described herein. By way of example, an upper plate or lower plate may be an otherwise solid structure having a channel etched or formed therein, which is covered by an upper plate or lower plate to form a closed channel without the use of any spacers. In still other embodiments, a nozzle may be entirely integrally formed as a single structure having a channel formed therein as opposed to being constructed from assembled plates.

In addition, as shown in the exemplary embodiment shown in FIGS. 1-2, nozzles 30 are displaced throughout basin 2 in a grid pattern, with five nozzles in communication with each supply header by way of a second line 24 and a first line 22, and the nozzles are shown in a staggered pattern. In other embodiments, more or fewer nozzles can be in communication with a header. In yet other embodiments, the arrangement of the nozzles can vary, including being on the same side of a supply header (as opposed to staggered) or below the supply header. In addition, in even further embodiments, the supply header may be of a circular shape or serpentine shape as opposed to the linear grid depicted in FIG. 1. The particular arrangement of a mixing system of the present invention can depend upon the size of a containment unit and the particular process being performed, and additional and alternative arrangements are appreciated by a person having ordinary skill in the art. In some embodiments, the nozzles may be placed approximately five to ten feet longitudinally along a supply header and offset approximately one to four feet from the header. In addition, as shown in the embodiment in FIGS. 1, 3, and 4, nozzles 30 are located on the bottom of the basin. In some embodiments, nozzles 30 can be attached to the bottom 6 of basin 2. In yet other embodiments, nozzles 30 are placed above the bottom 6 of basin 2.

In some embodiments, systems and methods of the present invention may include a flow control feature. In particular, in supplying gas to each first line 22 from a header 18, the gas may distribute unequally to each first line 22 (and the nozzle associated therewith). By way of example, gas may be supplied more freely to the first line 22 that is closest to the compressor 8 supplying the gas, and gas may flow less freely to the remaining first lines 22 and their respective nozzles.

In some embodiments, to obtain uniform or nearly uniform flow to all nozzles connected to a particular header, the present invention may include orifices, which may be located at any location between a header 18 and a nozzle 30. For example, in some embodiments an orifice may be configured for each connection point of header 18 with a first line 22. In some embodiments, an orifice may be located, alternatively or additionally, in each second line 24. Alternatively or additionally, an orifice could be located in the nozzle, such as, by way of example, in the portion of the nozzle connected to or adjacent to a second line. Orifices may be a relatively smaller passageway that limits flow from the header to the nozzle. In some embodiments, a check valve (not shown) may be used in addition to or instead of an orifice. Such check valves permit flow of gas from the header to the nozzle but do not permit backflow from the tank to the header. By using an orifice or check valve as described herein, the gas in the header may be provided in a generally equalized manner to each nozzle associated with that header. In addition, check valves offer an additional advantage of preventing backflow into the system, which could result in clogs and other problems in the system. The cracking pressure (at which flow is permitted in the output direction) can be selected for any particular system. Similar flow control measures may also be installed, if desirable, within the aeration components.

Figure 9A:
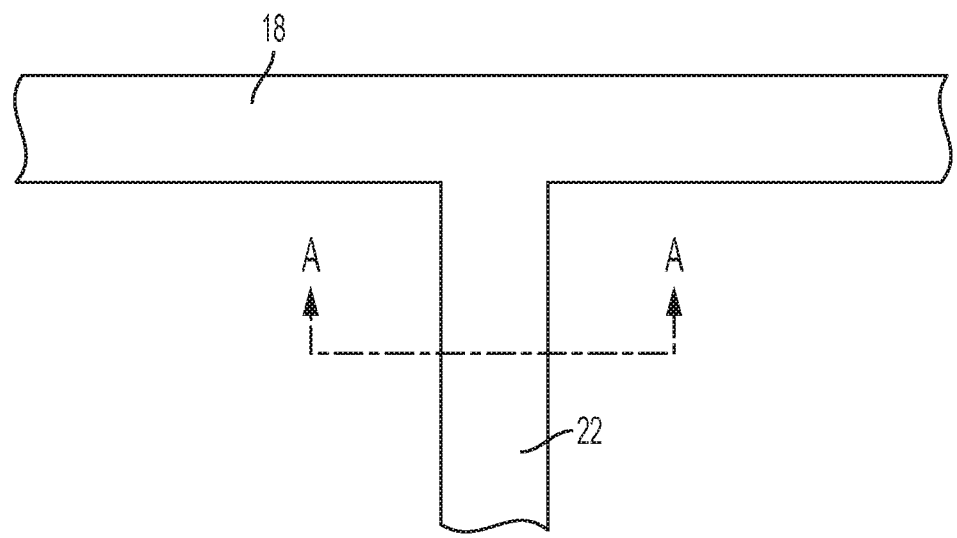
FIG. 9A is a view of a header in communication with a first line in accordance with an embodiment of the invention.
Figure 9B:
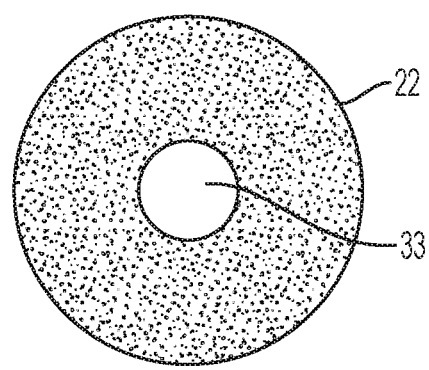
FIG. 9B is a view along line A-A of FIG. 9A.

By way of example, header 18 may have a diameter, such as two inches, that is greater in diameter than each first line 22, such as one inch. In some embodiments, an orifice may be configured near a connection point where header 18 joins each first line 22, such that the opening at that junction is at a desired diameter. For example, if a header 18 has a diameter of two inches and a first line 22 has a diameter of one inch, an orifice at the junction of header 18 and first line 22 may have a diameter of one-half inch. An example of such a configuration is shown for orifice 33 in the section view of FIG. 9B along the line A-A of FIG. 9A. The shaded area between first pipe 22 and orifice 33 may be formed in any suitable manner, such as by an insert or a modification to first line 22, an insert or modification to header 18 at the junction with first line 22, or the configuration of any type of connector used to join header 18 to first line 22.

As noted, such an orifice of any size could additionally or alternatively be located at other locations. In some embodiments, such orifices may be configured to provide a particular pressure to a nozzle and the orifice size may be configured to provide such a desired pressure based upon the particular specifications of a system, either through calculation or trial and error. In some embodiments, orifice configurations of the present invention may be replaceable or interchangeable, such that the orifice size may be changed. In still other embodiments, orifices of the present invention may be adjustable, such as during installation.

In some embodiments of the present invention, an orifice size may be altered as a function of the distance from the air source. In this regard, the orifice size may be increased or decreased for supply air to nozzles farther away from the source of air relative to nozzles that are located closer to the air source. Such deviations may promote, in some embodiments, a more uniform distribution of gas for mixing to the nozzles.

Figure 10:
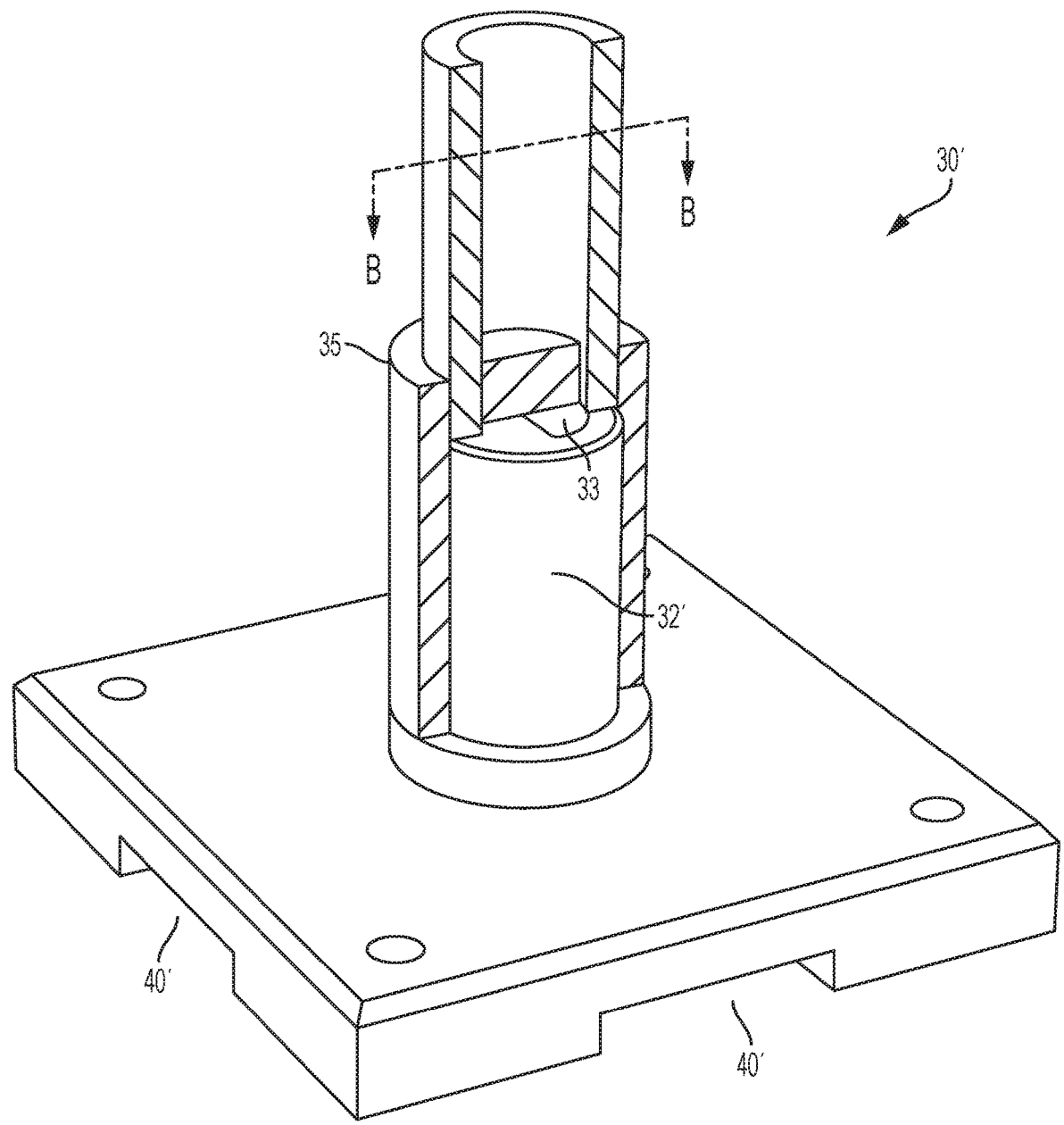
FIG. 10 is a view of an embodiment of an adjustable nozzle orifice of the present invention.
Figure 10A:
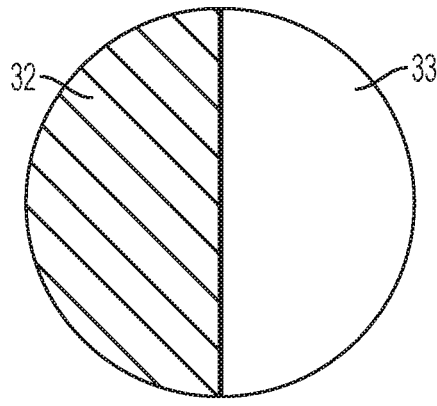
FIGS. 10A-10D are cross-sectional views of various settings of the adjustable nozzle orifice of FIG. 10 from the perspective of B-B (at various adjustments of the nozzle shown in FIG. 10)
Figure 10B:
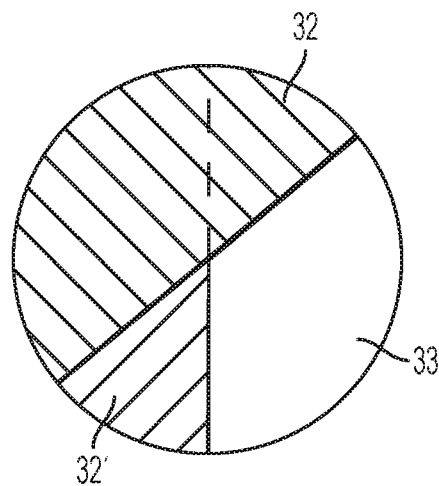
Figure 10C:
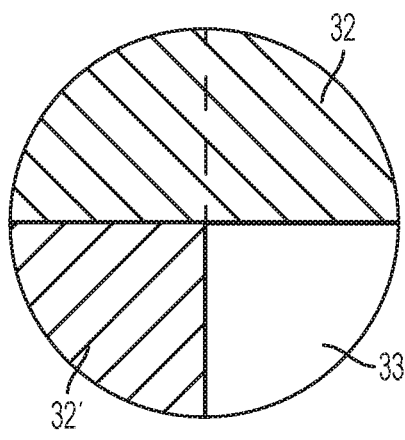
Figure 10D:
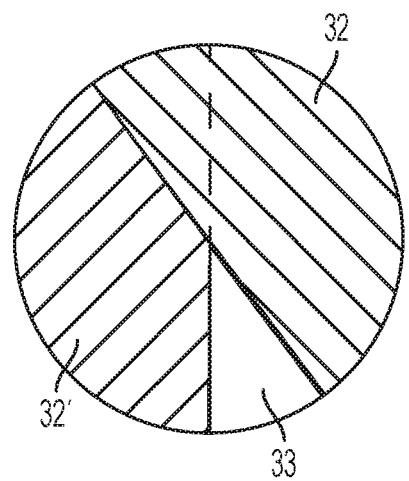

An illustrative embodiment of an adjustable orifice positioned at a nozzle is shown in FIG. 10. As shown, nozzle 30 is partially obstructed and partially open, and orifice 33 is disposed on nipple 32. As shown, orifice 33 is shown as a half-moon shape, although other shapes and orifice sizes may be utilized in a particular embodiment. Connector 35 is connected to nipple 32 and connector 35 is capable of rotation about nipple 32. Such rotation results in increasing or decreasing the exposed portion of orifice 33, thereby controlling the amount of pressurized gas that may pass through orifice 33 during operation. FIGS. 10A-10D illustrate various exemplary adjustments that alter the size of orifice 33, thereby regulating gas flow to the associated nozzle. Such adjustments may be made during installation of a system or subsequent to installation of the system. In addition, although shown in FIG. 10 in the context of a nipple, an adjustable orifice of this configuration or similar configurations may also be positioned at any location between a header pipe and a nozzle. For example, an orifice may be positioned in a first line 22 and a connector 35 may be disposed between a header 18 and such first line 22, thereby providing an adjustable orifice.

In some embodiments, systems of the present invention may also utilize receiver tanks. In operation, gas velocity in supply line 10 and receiver tank 5 may be low, but air velocity between receiver tank 5 and the containment unit, such as basin 2, may be high. A receiver tank, as described herein, may minimize piping headloss and the need to oversize piping. In this regard, such receiver tanks may be employed to negate any hydraulic differential between containment units and may facilitate the use of a common compressor for two or more containment units with different tank levels, volumes, or amount of substance therein.

Figure 12:
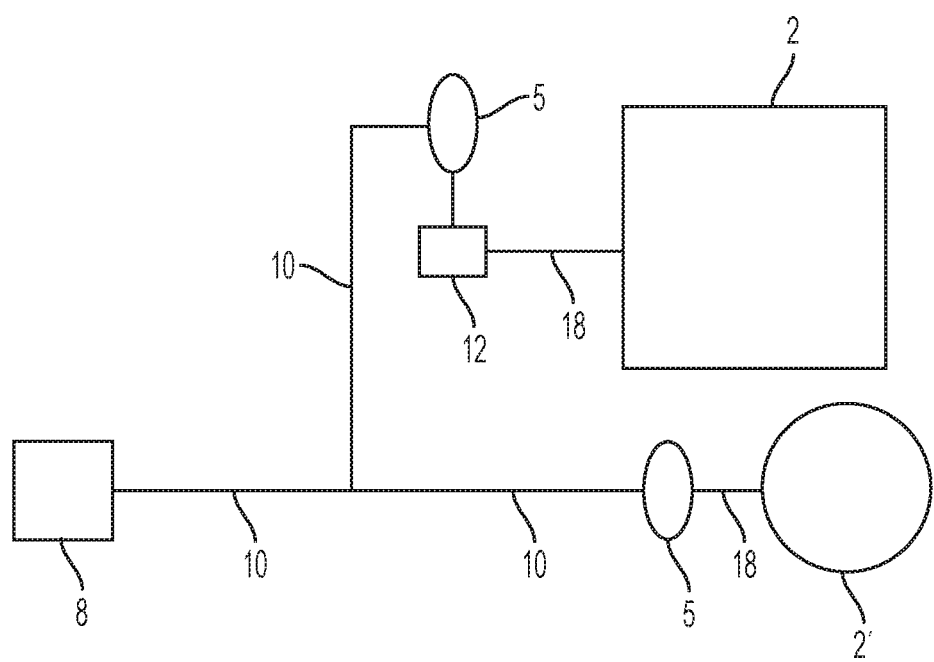
FIG. 12 is a schematic view of an embodiment of the present invention including reservoir tanks.

With reference to in FIG. 12, an exemplary embodiment utilizing receiver tanks is shown. As shown, compressor 8 is connected to and providing air to one or more aeration basins 2 and one or more sludge holding tanks 2' by way of supply lines 10. In the depicted embodiment, supply line 10 connects compressor 8 to receiver tanks 5. Receiver tanks may be located at any point between a compressor and a control panel for valves as described above. In some embodiments, a receiver tank may be positioned in close proximity to the valves controlling entry of air into headers 18. As one of ordinary skill in the art would appreciate, alternative mixing systems, such as mechanical mixers, submersible mixers, surface mixers, agitators, static mixers, and hyperbolic mixers, may be used with basin 2 or any containment unit for wastewater and are within the scope of certain embodiments of the present invention. Similarly, the number of mixing components and layout of the mixing components may vary within the scope of the present invention. In addition, the number and arrangement of mixing components may vary in other embodiments of the present invention. Furthermore, as used herein, the terms "connected" and "attached," and variations of those terms, includes, unless indicated otherwise by the context, components that are in direct connection and components that are indirectly connected by way of other components.

In some embodiments of the present invention, basin 2 may also be equipped for aeration. For example, as shown in FIG. 1, embodiments of the present invention may include diffuser heads 100 as the aerators, and each diffuser head 100 is serially connected to a diffuser pipe 102. Each depicted diffuser pipe 102 is then connected with header pipe 104, and header pipe 104 is connected with supply pipe 106. Supply pipe 106 is connected to blower 108, which delivers air or oxygen under pressure to each diffuser head 100 by way of supply pipe 106, header 104, and diffuser pipe 102. Valve 109 is connected with blower 108 to control the flow of air to supply pipe 106. In addition, valve 109 is in communication with PLC 20', which may control its opening and closing.

Various modifications to the illustrative embodiment are included within the scope of the present invention. In some embodiments, diffuser heads 100 may be located in proximity to bottom 6 but are not flush with bottom 6. In addition, diffuser pipe 102 may be secured to bottom 6 or located above bottom 6 and supply pipe 106 may be secured to a side 4 of basin 2. In some alternate embodiments, a system may include multiple supply pipes 106, wherein each supply pipe 106 may be connected to a valve 109.

Whether a single or multiple supply pipes, in the same manner as described above in the context of mixing, a control panel and/or PLC may optionally be used in connection with the valves to selectively control the supply of air or oxygen to each diffuser pipe. In such circumstances, the same PLC 20 and control panel 17 used for controlling mixing may also be used to control aeration, or a separate PLC or control panel may be used.

Figure 13:
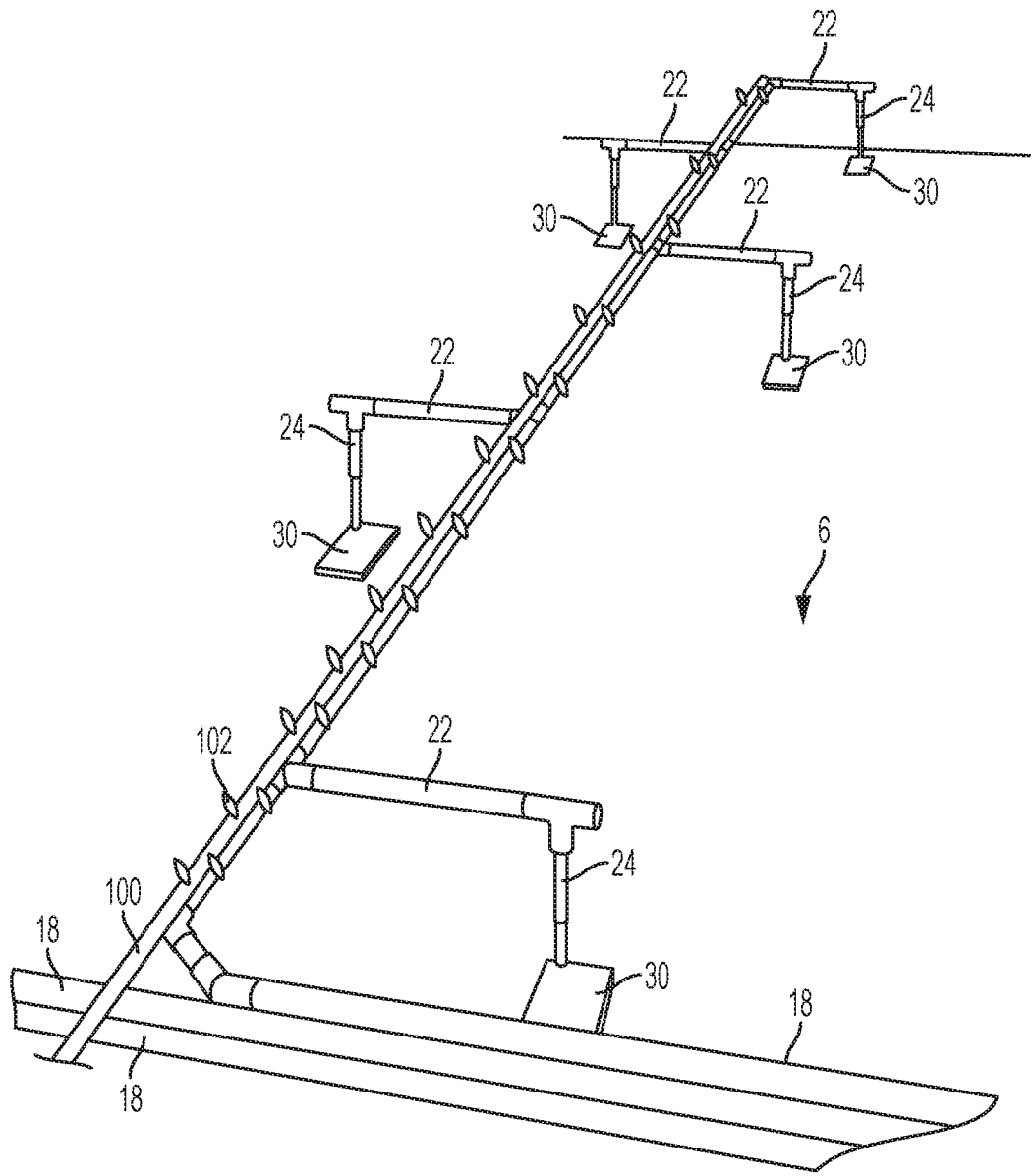
FIG. 13 is a detailed view of certain mixing and aeration components in an alternative embodiment of the present invention.

In an alternative embodiment of the invention, as shown in FIG. 13, diffuser pipe 102 may abut or be adjacent to or attached to supply header 18. In such embodiments, diffuser pipe 102 may be secured to header 18 by any suitable means, such as cable ties, clamps, or other mechanisms. Such diffuser pipes may be configured to release air above or below any adjacent or attached supply header.

The depicted aeration components herein are illustrative only, and it will be readily apparent to one of ordinary skill in the art that alternative types of aeration systems, aerators, and aeration components are within the scope of the present invention. By way of example, alternative aerators for use in embodiments of the present invention may include fine bubble (or fine pore) diffusers or course bubble diffusers, mechanical aerators, centrifugal blowers, turbo blowers, screw compressors, jet aerators, and positive displacement blowers. In addition, the layout and number of aeration devices may vary in alternative embodiments of the present invention. For instance, in some embodiments, the number or arrangement of diffuser heads 100 may vary.

In operation, wastewater treatment mixing system 1 functions to mix the contents of basin 2 and/or to aerate the contents of basin 2. For mixing, system 1 operates by compressor 8 providing pressurized gas into supply line 10. A conventional regulator or a throttle valve may be utilized to control the pressure or flow of the pressurized gas. The pressurized gas is generally a gas or fluid that has a lower density than the wastewater mixture (including any added compounds) that is present in basin 2. The pressurized gas flows through supply line 10 to the valves 14 in controller box 12. Each valve 14 is capable of opening and closing to selectively and controllably allow the pressurized gas to flow into the supply header 18 corresponding to that particular valve 14. When a valve 14 is opened, the pressurized gas flows into the respective header 18 for that valve. In one embodiment, the opening and closing of the valve can be controlled by the programmable logic controller 20. In others, the opening and closing of the valve(s) can be controlled manually or by other components described herein.

Figure 7:
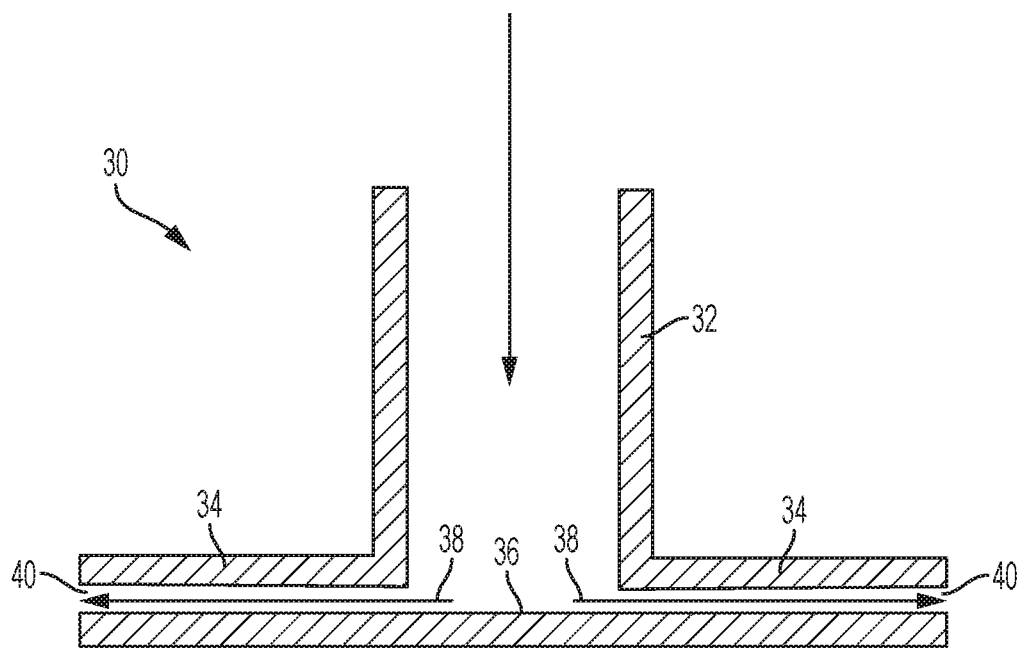
FIG. 7 is a schematic view showing the flow of gas through the nozzle of FIGS. 6A-6C pursuant to an embodiment of the present invention.

In one embodiment, no more than one valve 14 within control box 12 is open at any given time. In alternative embodiments, a plurality of valves 14 may be simultaneously open. When a valve 14 is open, the pressurized gas flows into and through a header 18 corresponding with that particular valve 14. As sufficient pressurized gas flows into header 18, it will also fill first line 22 and second line 24. The gas flow continues into nozzle 30. The flow of gas in nozzle 30 of FIG. 6 is shown by arrows in FIG. 7. As shown, the gas flows into nozzle 30 by entering nipple 32 and then continues to channel 38 and toward outlets 40. In general operation, valves 14 are opened in short, cyclic intervals.

In this regard, with reference to FIGS. 1 and 2A or FIGS. 1 and 2B, control panel 17 can send a signal to PLC 20 indicating to activate or deactivate the mixing system, such as the flow of air to nozzle 30 via header 18, first line 22, and second line 24. In that instance, PLC 20 may transmit a signal to controller box 12, and controller box 12 would actuate one or more control valves 14, optionally by way of PLC 20, based upon the signal to begin or end the mixing by controlling the supply of air to nozzle 30. Such operation may be carried out for the embodiment shown in FIG. 3B by control panel 17'. As a result of the bursts of gas exiting nozzle 30 through outlets 40 and entering basin 2, nozzle 30 generates a displacement of the substance in basin 2, which is generally larger in size than the displacement introduced into the system by conventional aerators used in an aeration process for treating wastewater. Due to the displacement of the substance within basin 2, mixing occurs. In addition, because the pressurized gas is less dense than the surrounding liquid composition in basin 2, the gas may rise in basin 2 and currents may be formed in the substance.

The burst of gas from the nozzle and the resulting displacement of the substance in basin 2 may vary in size, and various parameters may influence the burst and displacement, such as the size of channel 38 and outlets 40, the flow rate of the pressurized gas, and the density of the pressurized gas. In some embodiments, nozzles 30 do not create any bubbles that exceed a diameter of six inches. In addition, in other embodiments, other types of mixers, such as mechanical mixers, a signal may be supplied, such as from a control panel or PLC, to either supply or terminate power to the mixer.

In alternative embodiments, control panel 17 can also transmit a signal to the mixing system to control the rate or intensity of mixing. For instance, with reference to the embodiment shown in FIG. 1 and with reference to FIG. 2A, control panel 17 may send a signal to PLC 20, and PLC 20 may transmit a signal to controller box 12 to adjust the number of valves open or their degree of opening, thereby controlling the mixing rate. The actuator may control the flow rate by permitting or obstructing the flow of air, or the rate of air flow, to one or more of headers 18. In other embodiments in which other types of mixers are used, such as mechanical mixers, control panel 17 and PLC 20 may transmit signals to control the speed of the mixer. In still other embodiments, control panel 17 and PLC 20 may send signals to deactivate some of a plurality of mixers, thereby decreasing the overall mixing rate.

For instance, in some treatment processes, it is unnecessary to continuously mix the wastewater, and mixing may only be conducted during certain treatment processes or when certain conditions are met. Therefore, in some embodiments of the present invention, control panel 17 may indicate to activate or deactivate a mixing system or an aeration system, or to control the rate, duration, or intensity of mixing or aeration, such as based on the dynamic condition or parameters of the wastewater or the system. By way of example, probes for a single parameter (such as multiple ORP probes 108, nitrate probes 110, ammonia probes 112, DO probes 114, and pH probes 124 or for any other parameters, including, without limitation, devices indicating level, pressure, or flow) may be displaced within a containment unit, such as basin 2, and control panel 17 may monitor the measurements for a parameter within basin 2 and activate or deactivate mixing based upon those parameters. Furthermore, multiple probes for a single parameter may be located throughout the basin, and mixing or aeration may be activated in a particular area based upon the measurements from such probes in that area. Embodiments concerning mixing and aerating using such probes for dynamic measurements and operation are further disclosed in U.S. Pat. No. 9,567,245, which is incorporated by reference herein in its entirety. In addition, as used herein, the term "measured" and "measurements" include detected parameters, directly-measured values of parameters, and parameter values calculated or otherwise determined from the direct measurement or detection of one or more other parameters, either alone or in combination with additional data or measurements.

In some embodiments, system 1 may operate to provide sequence variability in mixing. By way of example, as described above, one or more headers (and their associated nozzles) may be selectively activated and deactivated. In some embodiments, the particular header(s) activated may be randomly, pseudo-randomly, or quasi-randomly selected, and such random cycles of mixing may advantageously avoid stagnation in the substance in the basin and disrupt steady state flow patterns in the substance. In addition, such random cycles may avoid accumulation of surface materials by dispersing such materials, thereby providing both potential aesthetic and utility benefits. In other embodiments, individual nozzles may be selected for activation and deactivation. In such embodiments, each nozzle may have a valve in communication with the control panel, which can transmit signals for opening or closing the nozzle valve or the degree it is opened or closed. In yet another embodiment, the activation and deactivation of the headers, or alternatively nozzles, may be conducted in a pre-selected pattern or based upon dynamic measurements of parameters in or relating to the basin.

In either the random or cyclic mixing processes, valves may control both the amount of gas permitted to enter a header, thereby controlling the intensity of gas introduced from that header to the substance, as well as the duration of gas permitted to the header. Alternatively, if a valve controlled by the control panel is included in the nozzle, the degree a valve is opened may be controlled to determine the intensity of the mixing from that nozzle. Similarly, the duration of time that gas is released to a header or a nozzle may also be controlled.

Pressure sensor 95 may be utilized in some embodiments as a system check for proper operation. In operation, with reference to FIG. 2B, pressure sensor 95 monitors the pressure of a header 18. As a result, the pressure required to open valve can indicate if the system is functioning properly or if there is an actual or potential malfunction, such as if the valves are not properly opening or if there is a clog. If a pressure measurement detected by a pressure sensor is an anomaly from normal operating conditions, the system may indicate that a valve or multiple valves or nozzles are not functioning or are clogged or that inspection is required. In such instances, the control panel may generate an alert, such as a sound, light, message, text message, email, or any other suitable indication. Alternatively, an automatic corrective action, such as a maintenance purge described below, could be initiated. In some embodiments, a paddle switch may be used instead of, or in addition to, pressure sensor 95, wherein the paddle switch measures air flow (as opposed to the pressure measured by pressure sensor 95).

In some embodiments, the present invention may also include tank level monitoring and control equipment, which may be utilized in the operation of the system. For example, again with reference to FIG. 2B, pressure sensor 15 may be utilized to control mixing and/or aeration of the substance of the basin based upon the amount, or level, of substance in the tank (also referenced herein as the tank level). In particular, upon installation, pressure sensor 15 may be calibrated such that the pressure in headers 18 serves as a proxy for the substance level in the basin, whereby the approximate tank level may be calculated from the measured pressure when nozzles in connection with the header associated with pressure sensor 15 are not in operation. In some instances, tank level may be used in determining the activation, deactivation, duration, or intensity of mixing or aeration in the system. By way of example, given that a decreased tank level may indicate more dense wastewater (or other substance depending on the application) in the basin and an increased tank level, such as after storms or heavy rain, may increase less dense and more diluted wastewater (or other substance depending on the application), the system may control the mixing frequency and/or intensity based upon such measured tank level. In some embodiments, the water level may also be used to control the frequency and intensity of aerating the substance in basin 2. Similarly, the tank level may be used to determine which and how many mixers should be activated in the tank at a given time. In addition, the use of pressure sensor 15 permits placement of the sensor outside of the basin such that it is more accessible and easily installed as opposed to other means of measuring substance level that require the installation and maintenance of hardware components within the basin itself. In some embodiments, the water level may also be used to control the frequency and intensity of aerating the substance in basin 2 in this same manner.

In addition, some embodiments of the present invention may allow for proportional mixing and aeration controls. For example, desired mixing parameters for a system, such as the amount and duration of gas supplied to a nozzle under certain conditions, may be calibrated, such as by adjusting valve operations, during the installation process for a particular tank level. As the tank level varies, it may be desirable in some applications to maintain a consistent impact on the system. Thus, the mixing parameters, including the duration and intensity of mixing from a nozzle (or for all nozzles connected to a particular header) may be adjusted proportionately (as dictated by the control panel) based upon the measured tank level so that the impact on the system remains proportionately consistent during dynamically-changing operating conditions. Thus, as the tank level increases or decreases, the system may modify the mixing duration, frequency, and/or intensity in a manner that it proportionally remains at that the desired level as applied to a particular tank level. Appropriate data for such operations can be stored in a memory in or connected to the control panel or may be determined by using the processor in the control panel. As explained above, such adjustments may be completed by adjusting which valves are opened, the duration of their opening, and/or the sequencing of their opening to allow air to flow to particular headers. In similar fashion, the aeration of the system may be similarly controlled based upon tank level. In some embodiments, tank level may be one of multiple factors considered in mixing or aerating a substance.

With respect to aeration, the disclosed embodiments of control panels and/or PLCs may also control the flow of air to diffuser heads 100, including based upon parameters dynamically measured from the wastewater. In some embodiments, the same control panel and/or PLC may be used for aeration and mixing, and in other embodiments a different control panel and/or PLC may be used. In either scenario, a control panel and/or a PLC may activate and deactivate the flow of air to diffuser heads 100, thereby controlling the aeration of the contents of basin 2. In other embodiments, the control panel and PLC may also control the rate of air flow to diffuser heads 100. As explained further herein, this system and process allow for automated control between wastewater treatment processes, such as aerobic, anaerobic, and anoxic treatment processes, and that control may optionally be based upon dynamically-measured parameters of the wastewater.

In some embodiments, other types of aeration devices may be utilized, such as mechanical aerators or blowers without variable speed drives that can only be turned on or off and the oxygen flow not regulated. In such embodiments, a control panel may signal to deactivate less than all of a plurality of devices used to compress atmospheric air for purposes of oxygenation, such as, without limitation, positive displacement blowers, centrifugal blowers, turbo blowers, screw compressors, or rotary disc surface aerators, in order to decrease the overall oxygen flow to the wastewater without regulating the specific output of each blower. In this manner, by selective activation and deactivation, the overall aeration and rate of aeration to the entire system may also be controlled.

In some embodiments of the present invention, the mixing systems and/or aeration systems described herein may also include a maintenance cycle. By way of example, a maintenance cycle may be manually initiated by a user or automatically initiated by the control panel, such as after a period without operation or upon detection of parameters indicated that cleaning is needed (such as an indication in a pressure sensor indicated that a system may be clogged). In operation, a maintenance cycle can discharge gas through the mixing system or aeration system to purge it, which may remove any undesired entry of substance from the tank into the mixing or aeration components. Such purging may be completed selectively for headers of the system or simultaneously for all mixers. In addition, such maintenance cycles may limit periods of inactivity of the system.

Although the foregoing description has been provided in the context of wastewater treatment, other types of wastewater treatment and also applications unrelated to wastewater treatment are within the scope the present invention. By way of example, embodiments of the present invention could include treatments in oxidation ditches, sludge treatment, other wastewater treatment processes, water storage, chemical storage, sequencing batch reactors, pumping stations, and food and beverage processing tanks.

As such, the foregoing description of illustrative embodiments of the invention has been presented only for the purpose of illustration and description and is not intended to be exhaustive or to limit the invention to the precise forms disclosed. Numerous modifications and adaptations thereof will be apparent to those of ordinary skill in the art without departing from the scope of the present invention.

It will be understood that each of the elements described above, or two or more together, may also find utility in applications differing from the types described. While the invention has been illustrated and described in the general context of wastewater treatment, it is not intended to be limited to the details shown, since various modifications and substitutions can be made without departing in any way from the spirit and scope of the present invention. As such, further modifications and equivalents of the invention herein disclosed may occur to persons skilled in the art using no more than routine experimentation, and all such modifications and equivalents are believed to be within the spirit and scope of the invention as described herein.

We claim:

1. A wastewater treatment system comprising:
   a source of pressurized gas connected to one or more supply lines for providing pressurized gas to wastewater contained in a containment unit, and
   a plurality of nozzles, wherein each nozzle comprises at least one opening and at least one nozzle is in connection with a supply line, and
   a control panel configured to control a supply of pressurized gas to the one or more supply lines,
   wherein the system is configured to selectively provide pressurized gas to at least a portion of the nozzles in a random or pseudo-random cycle or for a random or pseudo-random duration wherein such a cycle or duration is not based upon dynamically-measured properties of the wastewater.

2. The wastewater treatment system of claim 1 wherein the system is configured to selectively provide pressurized gas to at least a portion of the nozzles in a random cycle.

3. The wastewater treatment system of claim 1 wherein the system is configured to selectively provide pressurized gas to at least a portion of the nozzles for a random duration.

4. The wastewater treatment system of claim 1 wherein the system is configured to selectively provide pressurized gas to at least a portion of the nozzles in a pseudo-random cycle.

5. The wastewater treatment system of claim 1 wherein the system is configured to selectively provide pressurized gas to at least a portion of the nozzles for a pseudo-random duration.

6. The wastewater treatment system of claim 1 wherein the system is configured to provide pressurized gas to a first portion of the nozzles in a random or pseudo-random cycle and to subsequently provide pressurized gas to a second portion of the nozzles in the random or pseudo-random cycle.

7. The wastewater treatment system of claim 1 wherein the system is configured to provide pressurized gas to at least a portion of the nozzles for a first random or pseudo-random duration and to subsequently provide pressurized gas to at least a portion of the nozzles for a second random or pseudo-random duration.

8. The wastewater treatment system of claim 1 wherein the control panel is in communication with one or more valves that open and close in response to signals from the control panel.

9. The wastewater treatment system of claim 1 wherein the control panel is further configured to control the flow rate of pressurized gas to at least a portion of the nozzles.

10. The wastewater treatment system of claim 1 wherein pressurized gas is provided to less than all of the plurality of nozzles simultaneously.

11. The wastewater treatment system of claim 1 wherein the at least one of the one or more supply lines includes a removeable cap.

12. The wastewater treatment system of claim 1 wherein each nozzle comprises a plurality of outlets.

13. The wastewater treatment system of claim 1 wherein the system is configured to selectively provide pressurized gas to each nozzle connected to a supply line during the random-or pseudo-random cycle or for the random or pseudo- random-duration.

14. The wastewater treatment system of claim 1 further comprising a pressure sensor in connection with one or more supply lines.

15. The wastewater treatment system of claim 1 further comprising an aerator connected to a source of air for providing aeration the wastewater in the containment unit.

16. The wastewater treatment system of claim 1 wherein:
   the one or more supply lines comprises a plurality of supply lines for providing pressurized gas to wastewater contained in the containment unit, and
   each nozzle of the plurality of nozzles comprises at least one opening and at least one nozzle is in connection with at least one of the plurality of supply lines, and
   the system is configured to selectively provide pressurized gas to at least a portion of the plurality of nozzles in a random or pseudo-random cycle or for a random or pseudo-random duration.

* * * * *